(12) United States Patent
Koeppel et al.

(10) Patent No.: US 6,477,575 B1
(45) Date of Patent: Nov. 5, 2002

(54) SYSTEM AND METHOD FOR PERFORMING DYNAMIC WEB MARKETING AND ADVERTISING

(75) Inventors: Arthur Koeppel, Richmond, VA (US); Jonathan Turner, Richmond, VA (US)

(73) Assignee: Capital One Financial Corporation, Glen Allen, VA (US)

( * ) Notice: Subject to any disclaimer, the term of this patent is extended or adjusted under 35 U.S.C. 154(b) by 1 days.

(21) Appl. No.: 09/660,496

(22) Filed: Sep. 12, 2000

(51) Int. Cl.⁷ ............................................. G06F 15/173
(52) U.S. Cl. ..................... 709/224; 709/206; 709/246; 709/248; 705/14; 705/26
(58) Field of Search ................................ 709/224, 218, 709/219, 201–206, 223, 229, 231, 248, 249, 238, 245, 246; 705/10, 14, 26, 27

(56) References Cited

U.S. PATENT DOCUMENTS

| | | | | |
|---|---|---|---|---|
| 5,948,061 A | * | 9/1999 | Merriman et al. | 709/219 |
| 5,949,419 A | * | 9/1999 | Domine et al. | 345/349 |
| 6,018,748 A | * | 1/2000 | Smith | 707/501 |
| 6,038,598 A | * | 3/2000 | Danneels | 709/219 |
| 6,226,656 B1 | * | 5/2001 | Zawadzki et al. | 707/506 |
| 6,286,043 B1 | | 9/2001 | Cuomo et al. | 709/223 |

* cited by examiner

Primary Examiner—Ario Etienne
(74) Attorney, Agent, or Firm—Finnegan, Henderson, Farabow, Garrett & Dunner, L.L.P.

(57) ABSTRACT

Methods and apparatuses for performing dynamic Web-based market analysis are disclosed. A Web server presents a Web page including content to a plurality of users, via browser applications located at each user's client site. While each user views the site, detailed activities by each user are collected in a client side data store located in each client site. After a completion event occurs at each client site, such as a respective client side data store fills up, the collected activity data is sent back to the Web server, where its is stored in a server side data store. An analytical program executed by the Web server retrieves the collected response data from the server side data store and performs market analysis. The analytical program produces results that reflect the success of the content presented in the Web page, and these results are used by a middleware program executed on the Web server to update the content presented in the Web page on a "real-time" and automatic basis.

88 Claims, 15 Drawing Sheets

*CapitalOne*   NEW   DESIGNER CARD   CUSTOMERS   SHOP

HOME
PRODUCTS — 420
NEW eCARD
9.9% PLATINUM
GOLD CARD
CLASSIC CARD
MILES ONE
SECURED CARD
COLLEGE CARD
HIGH SCHOOL CARD
INVESTMENTS
CERTIFICATES OF DEPOSIT
MONEY MARKET ACCTS
YOUR PRIVACY
WIRELESS PHONES

THE RIGHT PRODUCT FOR THE RIGHT PERSON 9.9% PLATINUM CARD - YOU DESERVE IT."

FIRST VERSION - OUR PLATINUM 9.9% CARD IS OUR REWARD FOR THOSE WHO HAVE ACHIEVED AN EXCELLENT CREDIT RECORD. WHERE OTHER COMPANIES AIM TO "MEET OR EXCEED" THE EXPECTATIONS OF THEIR ASSOCIATES, CUSTOMERS AND SHAREHOLDERS... OUR GOAL IS TO ABSOLUTELY BLOW YOUR DOORS OFF. CLICK HERE TO APPLY.

OUR SECURED CARD IS YOUR WAY OF BUILDING A STRONG CREDIT RECORD. WE WILL WORK WITH YOU TO HELP YOU ESTABLISH CREDIT AND MANAGE YOUR FINANCES. EACH OF OUR CUSTOMERS TAKES A UNIQUE JOURNEY THROUGH CAPITAL ONE. EVERY ACCOUNT IS CUSTOM-FITTED TO THE INDIVIDUAL'S CIRCUMSTANCES. WE MARKET TO OUR CUSTOMERS' PRACTICAL NEEDS, THEIR PERSONAL PASSIONS, THEIR STAGES OF LIFE. WE BUILD STRONG, LASTING RELATIONSHIPS THROUGH HIGH-VALUE PRODUCTS AND FIRST-CLASS SERVICE.

CAPITAL ONE HAS 24 MILLION CUSTOMERS - MORE THAN AOL® FIDELITY INVESTMENTS® OR CHARLES SCHWAB®.

THIRD VERSION: THIS IS VERSION THREE OF MARKETING TEXT THAT CAN BE TESTED FOR EFFECTIVENESS. APPLY FOR THE E-CARD TODAY! JOIN THE RANK OF THE THOUSANDS OF E-SHOPPERS THAT ARE ENJOYING THE SECURITY OF A CAPITAL ONE E-CARD. THIS CARD GIVES YOU FULL PROTECTION AGAINST THESE NEW E-COMMERCE WORRIES. CLICK HERE TO APPLY.

GET ON THE E-COMMERCE BANDWAGON. APPLY TODAY.

— 425
— 440

THE RIGHT CARD FOR YOU
ANSWER THESE QUESTION TO FIND THE RIGHT CARD FOR YOU

DO YOU CONSIDER YOUR CREDIT RATING TO BE:
○ EXCELLENT
● ABOVE AVERAGE
○ NEEDS SOME IMPROVEMENT
○ NEEDS MUCH IMPROVEMENT

ANNUAL INCOME
○ 0-20,000
○ 20,000-40,000
● 40,000-60,000
○ MORE THAN 60,000

DO YOU CURRENTLY HAVE A GOLD OR PLATINUM CARD?
○ YES  ● NO

DO YOU:
● OWN  ○ RENT

ARE YOU A STUDENT?
○ YES  ● NO

[SUBMIT]

SYSTEM AND METHOD FOR PERFORMING DYNAMIC WEB MARKETING AND ADVERTISING

CROSS-REFERENCE TO RELATED APPLICATIONS

This application relates to U.S. patent application Ser. No. 09/660,495, filed Sep. 12, 2000, entitled "SYSTEM AND METHOD FOR PERFORMING WEB BASED IN-VIEW MONITORING", owned by the assignee of this application and expressly incorporated herein by reference in its entirety.

BACKGROUND OF THE INVENTION

1. Field of the Invention

The present invention relates to Web-based content delivery systems and methods, including Web-based target advertising systems and Web-related marketing systems and methods. More particularly, the invention relates to Web-based methods and systems for adjusting the delivery or presentation of content according to collected user responses.

2. Background Information

On-line advertising and content provision has grown tremendously since the inception of the Internet and on-line services. Users can access a wide variety of information associated with their interests by using the Internet and accessing Web sites generated by providers. A computer equipped with a program called a browser, such as Netscape Navigator from Netscape Corporation, makes it a simple task to traverse the vast network of information available on the Internet and, specifically, its subpart known as the "World Wide Web."

The architecture of the Web follows a conventional client-server model. The terms "client" and "server" are used to refer to a computer's general role as a requester of data (the client) or provider of data (the server). Under the Web environment, Web browsers reside in clients and specially formatted "Web documents" reside on Internet (Web) servers. Web clients and Web servers communicate using a protocol called "HyperText Transfer Protocol" (HTTP).

In operation, a browser opens a connection to a server and initiates a request for a document or a Web page including content. The server delivers the requested document or Web page, typically in the form coded in a standard "HyperText Markup Language" (HTML) format. After the document or Web page is delivered, the connection is closed and the browser displays the document or Web page to the user.

The Internet consists of a worldwide computer network that communicates using well defined protocol known as the Internet Protocol (IP). Computer systems and servers that are directly connected to the Internet each have an unique address consisting of four numbers separated by periods such as "123.456.0.3". To simplify Internet addressing, a "Domain Name System" was created that allows users to access Internet resources with a simpler alphanumeric naming system. For example, the name "capitalone.com" is the name for a computer system or Web server operated by Capital One®.

To further define the addresses of resources on the Internet, a Uniform Resource Locator system was created that uses a Uniform Resource Locator (URL) as a descriptor that specifically defines a type of Internet resource and its location. URLs have the following format: "resource-type://domain.address/path-name." The "resource-type" defines the type of Internet resource. Web documents, for example, are identified by the resource type "http", which indicates the protocol used to access the document.

To access a document on the Web, the user enters a URL for the Web document into a browser program executing on a client system with a connection to the Internet. The Web browser then sends a request in accordance with the HTTP protocol to the Web server that has the Web document using the URL. The Web server responds to the request by transmitting the requested object to the client. In most cases, the object is a plain text document containing text (in ASCII) that is written in HTML. Such objects often contain hyperlinks to other Web documents. The Web browser displays the HTML document on the screen for the user and the hyperlinks to other Web documents are emphasized in some fashion such that the user can select the hyperlink.

In some instances, the HTML document may contain data from more than one server. For example, remote text and images may be retrieved from remote servers and integrated into a Web document by a client system. One server may provide an image file, while another server may provide text information to the client system over a network such as the Internet. Different techniques are available to display these types of composite Web documents. For example, a program called a servlet executing on one of the servers may combine data from the various servers referenced in a selected Web document and transmit the composite Web document to the client. In other configurations, the client may utilize a program called an applet, which may be transmitted to the client from one of the servers, to access the multiple servers offering parts of the composite and to build the composite Web document.

Generally, users view the content delivered in the Web pages and may select hyperlinks to other sub pages of a Web site, or to entirely different Web sites. Providers associate the users "browsing" these Web pages as potential consumers for the products and services they provide. By simply providing a Web server having information on a providers' product and service offerings and a customer database, and linking the Web server to the Web, providers may track user interactions with the Web server including visits, sales, buying trends and product/service preferences-all at the user level. Providers may then present or offer its customers with products and services they are most likely to buy-on an individual basis. For this reason alone most marketing professionals consider the Web to be one of the best direct marketing tools. In order to gain new, or retain existing, customers, providers need to ensure they present products and services that potential consumers are interested in. Accordingly, the importance of target advertising and target content provision has become an important role in the way providers conduct business over the Internet.

One conventional technique associated with target advertising is the use of advertising banners presented on existing Web pages generated by providers. When a user accesses a Web page associated with a provider, using a Web browser such as Netscape Navigator or Microsoft Internet Explorer, a banner advertising the provider's products or services appears on the Web page. This banner may be presented by the Web page's provider, or may be provided by a third party advertisement server. When an interested user selects the advertisement (by "clicking through" on the banner) the user is generally forwarded to another Web page or site associated with the advertisement. This page or site may be the third party advertiser's home page. The success of the advertisement is based upon the user's response, in this case, the user "clicking through" the advertisement or banner, to receive more information on the content advertised.

Conventional implementations of target advertising attempt to present appropriate information, or advertisements, to selected users, such that the probability of that user being interested in the advertisement increases. These implementations monitor and collect limited user response information, along with information associated with the advertisement presented to the users. The user response information generally includes user identification data such as, user ID, domain type, location, and other general information associated with the user. The advertisement information generally includes the particular advertisement presented, the number of times the advertisement was presented, the advertisements selected by a user, and the Web pages on which these advertisements were presented. User profiles may be created that associate user interests based on the types of advertisements and Web pages the users view. The collected information is analyzed to associate a success value with a particular advertisement based on the user information and the advertisement data. For example, a successful advertisement may be declared if the advertisement produced a sufficient number of "click throughs" from a plurality of users.

However, in the event an advertisement is not declared successful, new advertisements or banners may be presented to selected users, based upon their profile. For example, users interested in athletics or sports, based on their profile, may be targeted with advertisements associated with athletic apparel, while users interested in music may be presented with advertisements associated with available concert tickets or audio CDs.

Advertisements are adjusted by replacing the presented advertisement with another image/text object stored in a database. That is, when a target advertisement is to be changed, a replacement advertisement image/text object is retrieved from a database and positioned in the accessed Web page the previous advertisement was located. Accordingly, entire banners are replaced each time a new advertisement is needed to target a selected user. Furthermore, when the objects stored in the database are no longer effective, these objects must be modified and updated, which may take a significant amount of time.

Conventional implementations of target content provision for Web sites are also associated with the disadvantage of time consumption. The conventional techniques adjusting Web site renderings is a time consuming process which incorporates human intervention and an extreme amount of information. To evaluate the success of content presented on Web sites, the providers of the site generally collect user response data similar to that described above. That is, user information such as cookies, and general content information is monitored and collected. A database is created of this collected information, which includes massive amounts of data. The information is later analyzed either by an analytical engine, or through user intervention, and resultant data is created expressing the likelihood of successful content for various profiles of target users. Decisions are made on the type of content that should be provided, and the content is manually adjusted. This includes changing a Web site's presentation, or the content provided by the site, for example changing a loan percentage rate or incentives on a type of product for sale. This process can take days, weeks or sometimes months, depending upon the resources available to a provider.

Although conventional on-line target advertising and content provision techniques allow adjustments to be made on downloaded documents in order to target selected users, they lack the ability to dynamically adjust and create specific content within the Web page or site, such that the content can be automatically adjusted on a "real-time" basis, and monitor the results of the dynamic adjustments for market analysis.

SUMMARY OF THE INVENTION

In view of the foregoing, it is therefore desirable to have a method and system for dynamically delivering and presenting content to users in a Web-based environment, such that the content provided by a Web site can be automatically adjusted based upon collected user responses, on a "real-time" basis.

Methods, systems and articles of manufacture consistent with the present invention collect detailed user activity information while the users are accessing Web sites, and automatically adjust the content presented in the Web site to target selected users. The changes to the content can be very drastic, such as the entire site being completely adjusted, or very minute, such as the replacement of font in selected areas of the site.

In accordance with an embodiment of the invention, a Web server presents a Web page including content to a plurality of users, via a browser executing at each users' client site. While the users view the page, detailed activities performed by each user, such as "click-throughs", screen scrolling, and mouse movements are collected in a client side data store using client side scripting, applets or similar means. After an event occurs, such as the client side data store fills up, a new URL is selected, the browser is closed, or a new Web page is selected, the collected activity data is sent back to the Web server where its is stored in a server side data store. A program executed by the Web server retrieves the collected response data from the data store and performs market analysis and produces results that reflect the success of the content presented on the Web page displayed to the users. These results are used by a second program executing on the Web server to update the content presented to the user, on a "real-time" and automatic basis.

Accordingly, the Web server can present targeted content to a user, or a group of users, based on rules associated with the users' profiles. The content can be dynamically adjusted, based on the rules, to present entirely different content or subtle differences, that may appeal to the users. The users' responses to the new content are monitored, and subsequent changes can be made by following the same process. Thus, the present invention performs closed loop "hands-free" market analysis on the effectiveness of rendered Web pages and allow the pages to be automatically altered for future testing and analysis.

BRIEF DESCRIPTION OF THE DRAWINGS

The foregoing summary and the following detailed description should not restrict the scope of the claimed invention. Both provide examples and explanations to enable others to practice the invention. The accompanying drawings, which form part of the description of the invention, show several embodiments of the invention, and together with the description, explain the principles of the invention.

Accompanying drawings:

FIGS. 4A–4F are examples of various types of content that can be rendered on a Web page, in accordance with methods and systems consistent with the invention;

FIGS. 4G–4J show the Web page displayed in FIG. 4c, after predefined rules are applied to alter the content, in accordance with methods and systems consistent with the invention;

DETAILED DESCRIPTION

The following description of embodiments of this invention refers to the accompanying drawings. Where appropriate, the same reference numbers in different drawings refer to the same or similar elements.

In accordance with an embodiment of the invention, a network is configured such that users, located at respective client nodes equipped with browser software, request a Web page to be served to them from a Web server that resides on the Internet at a uniform resource locator. The Web server receives the requests and runs a predefined middleware program, which determines the marketing content to be placed on the requested Web page. The Web server then serves the page to the clients.

Upon receiving the Web page, each client enables the users to browse the content displayed on the page. The users' behavior in response to the displayed page is monitored at each client node, by capturing events such as mouse movements, scrolling, resizing the browser window, URL selections and/or other similar user initiated events. The captured events are sent back to the Web server in response to a detected client side trigger, and the captured event data is stored into a server side data store.

An analytical program, executing in the Web server, analyzes the collected user event data to determine the effectiveness of the content presented on the Web page. The analytical program determines whether any changes to the content are needed, and modifies or produces new rules associated with the content. A middleware program, also executing in the Web server, produces modified content to be rendered in the Web page using the rules associated with the content. When the Web server receives a subsequent request for the Web page, the Web server serves the modified page back to the client nodes as an updated Web page. The above described process is continuously repeated allowing the present invention to perform automatic analysis on the content presented on Web pages, and dynamically adjust the content to target selected user groups, for the purposes of achieving marketing or advertising goals.

Figure 1:
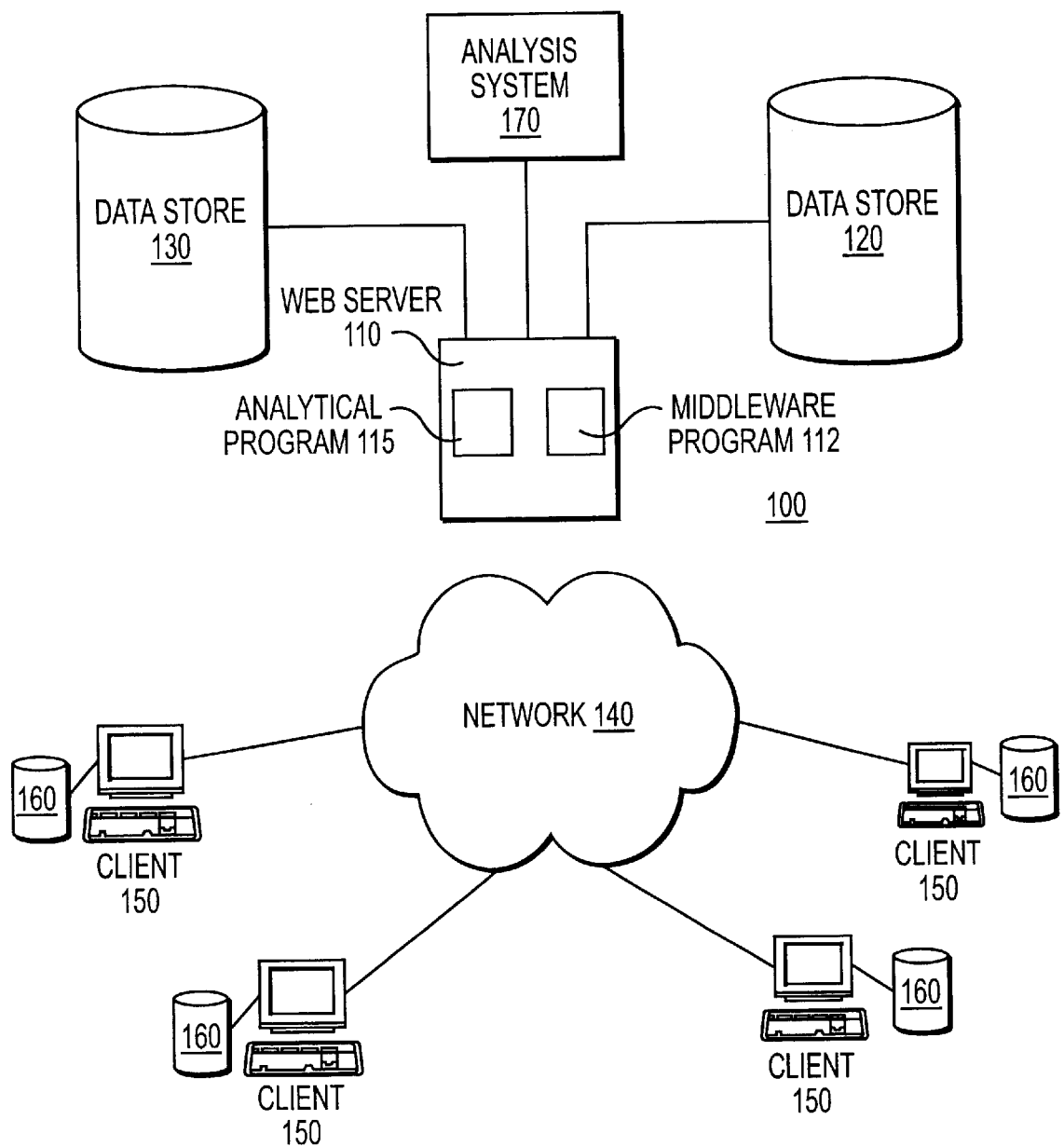
FIG. 1 is a block diagram of a Web-based network, in accordance with methods and systems consistent with the invention.

FIG. 1 shows a block diagram of a network environment 100, in which the features of the invention may be implemented. As shown, network environment 100 comprises a Web server 110, data store 120, data store 130, a network 140, analysis system 170, and client nodes 150. In addition, Web server 110 comprises of middleware program 112 and analytical program 115.

Web server 110 may be implemented through a desktop computer, workstation or any other Web server system known in the art. Web server 110 may be equipped with Web server software such as, Microsoft Internet Information Server, Novell Web Server, Netscape Enterprise Server, or any other Web server software known in the art.

Client nodes 150 may include a desktop computer, workstation, laptop, personal digital assistant or any other similar client side system known in the art. Client nodes 150 are equipped with browser software such as Netscape Navigator, Microsoft Internet Explorer, or any other known browser software. A client-side data store 160 may also be provided for storing marketing content, content formatting information, and any other content related information, as well as user event data. Client side data store 160 may be configured as an array, flat file or any other memory configuration known in the art.

Network 140 connects Web server 110 and client nodes 150 and may include one or more communication networks, including the Internet or any other similar network that supports Web-based processing. Client nodes 150 may connect to network 140 through any suitable wired or wireless supported connection.

Middleware program 112 determines the content to serve to the client and may be constructed using JavaScript, Java Servlet, Java ServerPage, Active Server Page, Perl, C++, VB Script, XSL, SQL, or any other similar programming language.

Analytical program 115 reads and analyzes collected user response data to produce results associated with the effectiveness of the content rendered to the client nodes 150. Based on the results, analytical program 115 adjusts rules and content stored in data store 130. Analytical program 115 is programmed by management and analysis system 170, with analytical program rules that govern the analysis on the collected user response data. Analysis system 170 may initialize analytical program 115 prior to the first rendering of a Web page, and may periodically adjust the analytical program rules during system operation. Analytical program 115 may be constructed using JavaScript, Java Servlet, Java ServerPage, Active Server Page, Perl, C++, VB Script, XSL, SQL, or any other similar programming language. Analytical program 115 may be located in a remote location from the Web server as well.

Data store 120 connects to Web server 110, and stores user event data collected at the client nodes 150. Data store 120 may include a database or flat file data store, or may also include a flat file data store that flushes its stored data to a database for reliability and access time purposes. Furthermore, data store 120 may include a redundant database that ensure data is available in the event a primary storage element experiences a fault or error. A multitude of fault tolerant architectures may be implemented to ensure data consistency and availability.

Data store 130 connects to Web server 110, and stores content and associated rules (referred to as content rules) controlling how the content is to be rendered. As described for data store 120, a multitude of fault tolerant architectures may be implemented with data store 130 to ensure data consistency and availability. The content may include attributes associated with content renderings, such as document structure, wireless card structure, titles, headings, paragraphs, lines, lists, tables, links, graphics, objects, multimedia, scripts, forms, frames, colors, wording, size, positioning, background properties, border properties, font properties, text properties, or any combination thereof. The content may also include, but is not limited to, products and services such as wireless phones, credit cards, available financial solicitations (loans) or any other products and services that may be solicited using Web-based marketing or advertising techniques.

Content rules may include code that governs how the content is rendered on a Web page presented at the client nodes. These rules may control variations of the attributes associated with the content, such as the types of font, text, color, position, products, characteristics of associated multimedia files, various services available, or any other types of attributes associated with the content rendered. The rules may also control the frequency in which the variations of the attributes take place, such as rendering a particular font for 20% of the rendering time, or rendering a particular version of the content for 30% of the rendering time. As described above, a multitude of variations of rules and content can be processed by the Web server, and are not limited to the examples listed above.

Figure 2:
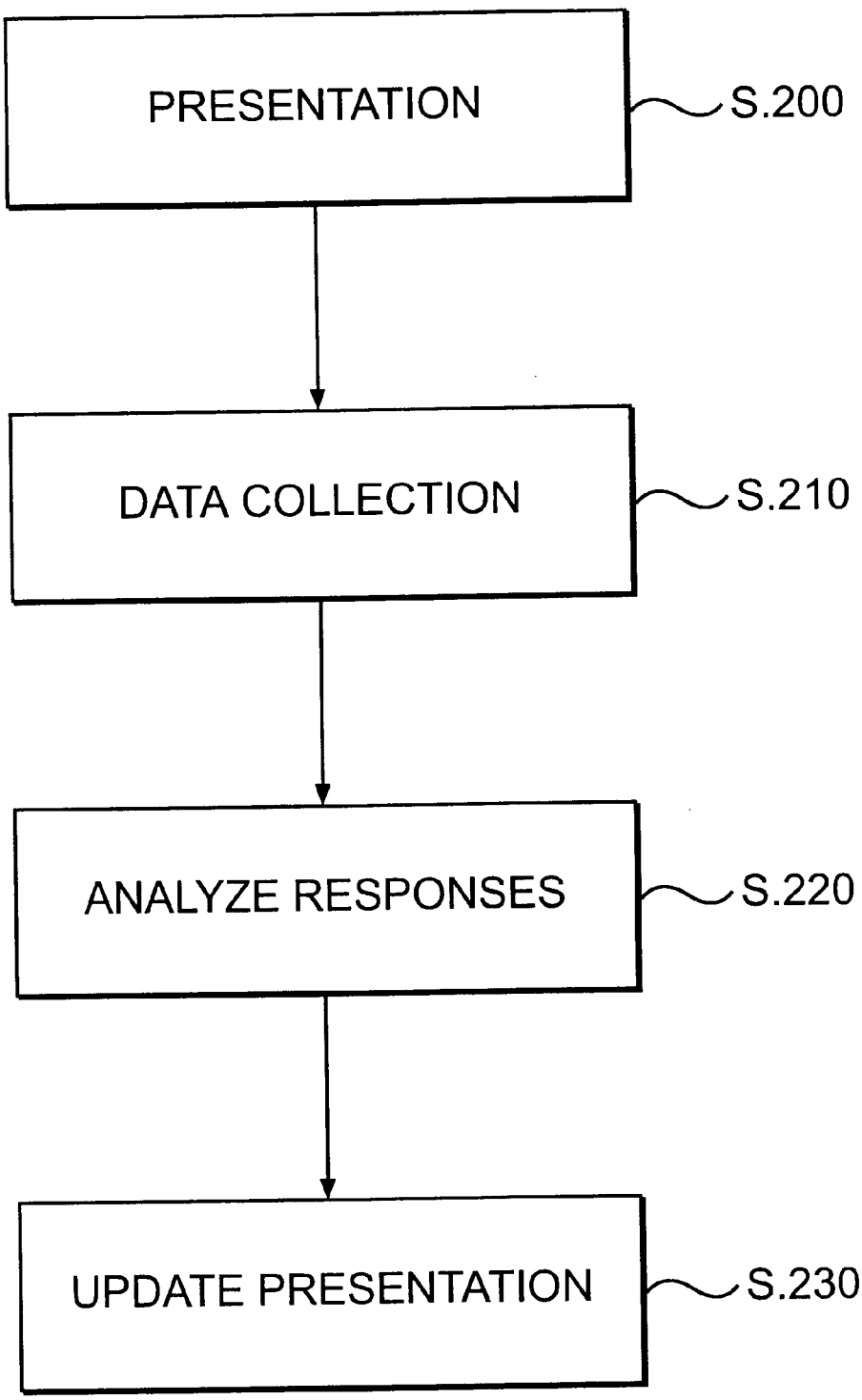
FIG. 2 is an exemplary flow chart of the steps performed by the Web-based network, in accordance with methods and systems consistent with the invention.

FIG. 2 is an exemplary flow chart of the steps performed by network 100 when performing dynamic Web-based content delivery, in accordance with methods consistent with the invention. The process begins when users located at client nodes 150 request a Web page from a Web server 110 located on network 140, using well known client side Web page accessing techniques. In response to the request, Web server 110 subsequently provides the requested page to the client nodes and browser software executing on each client node (Step S.200). A detailed description of an exemplary presentation process will be described below with reference to FIG. 3.

Each user browses the Web page, and initiate user events by performing activities such as screen scrolling, mouse movements, page resizing, link selections, or any other similar user activity associated with page browsing. The user events are monitored, collected and stored in each respective client side data store 160 (Step S.210). In response to a client side trigger detected at each client node, the stored user events are subsequently returned to the Web server 110 and stored in data store 120. A detailed description of an exemplary data collection process will be described below with reference to FIG. 5.

Analytical program 115 retrieves the stored user event data, and performs analysis (e.g. for marketing or advertising purposes) on the stored user event data in relation to the served content (Step S.220). Upon completion of the market analysis, analytical program 115 may edit the content and content rules stored in data store 130. A detailed description of an exemplary analysis process will be described below with reference to FIG. 6.

Upon detection of a subsequent request for the Web page from any client node 150, middleware program 112 applies the content rules and content updated in data store 130, adjusts the content associated with the requested Web page, and the page with the adjusted content is served back to the client nodes 150 requesting the page. Requesting client nodes 150 receive the Web page with the adjusted content and presents the page to respective users via the browser software executing at each respective client node. (Step S.230). A detailed description of an exemplary update process will be described below with reference to FIG. 3.

The process illustrated in FIG. 2 may continue in a closed loop enabling the Web server 110 to perform dynamic market analysis on rendered content and perform automatic content modifications to test the effectiveness of the modified content.

Figure 3:
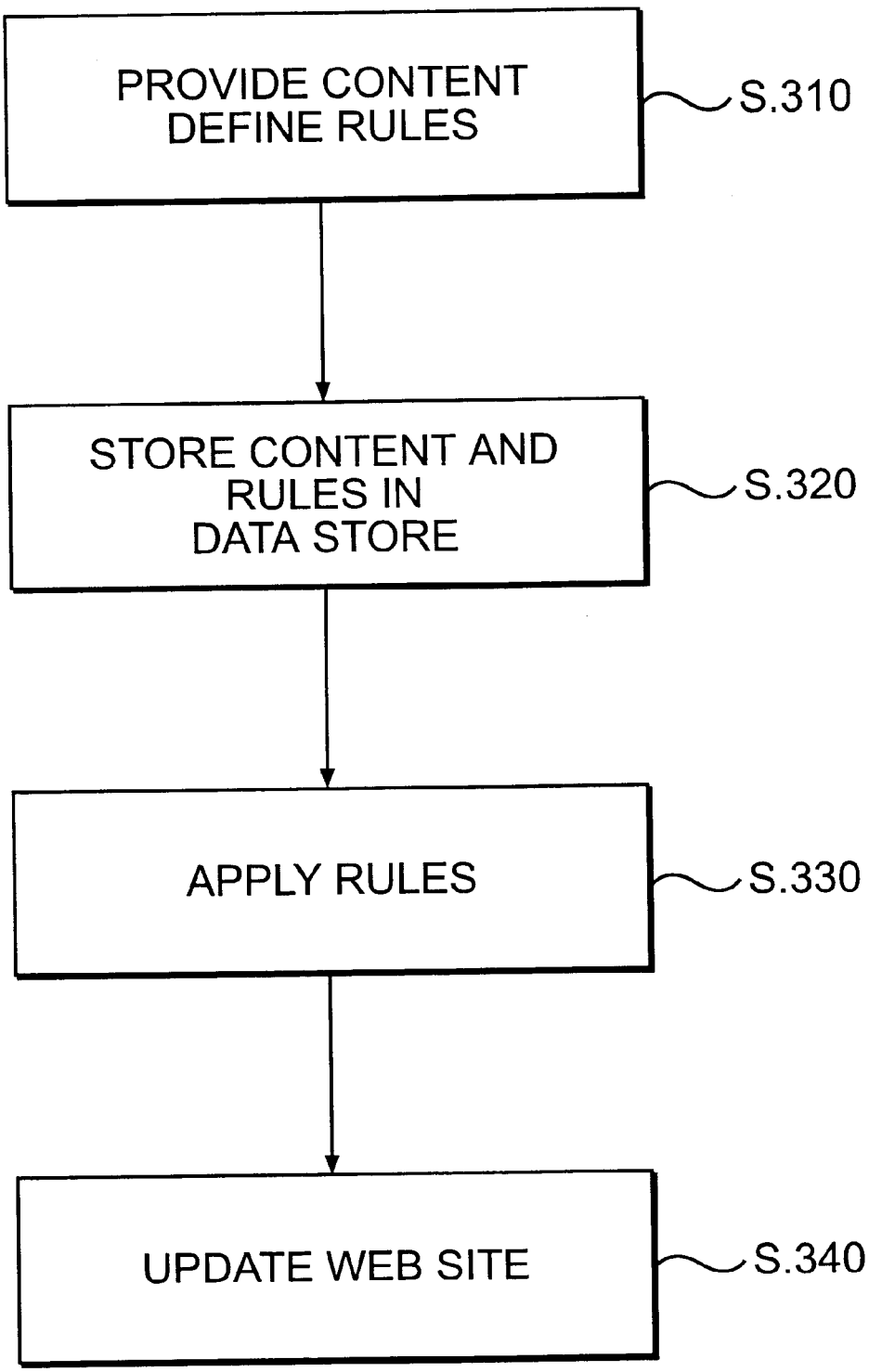
FIG. 3 is an exemplary flow chart of the steps performed by the presentation step shown in FIG. 2, in accordance with methods and systems consistent with the invention.

FIG. 3 is a flow chart of the presentation process described in FIG. 2. The process begins with the content to be rendered and the rules associated with the content being initialized (Step S.310).

The provider governing the Web server determines the types of content it wishes to market. The content may be, for example, versions of financial products, such as credit cards, offered from a financial institution. The different credit card versions may include, for example, various percentage rates, physical types of cards offered (images printed on the face of the credit card), and introductory offers associated with each card.

Figure 4A:
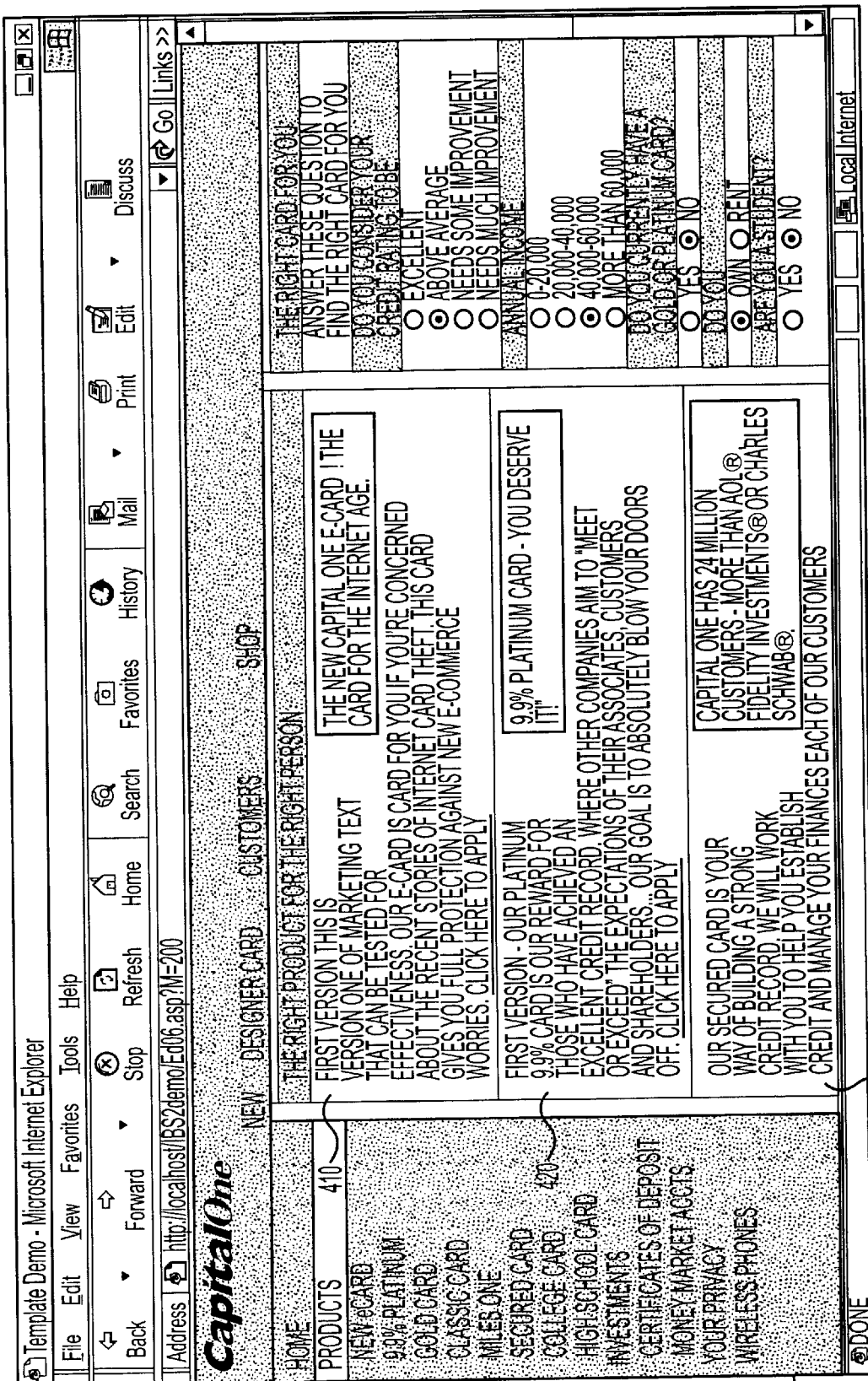
Figure 4B:
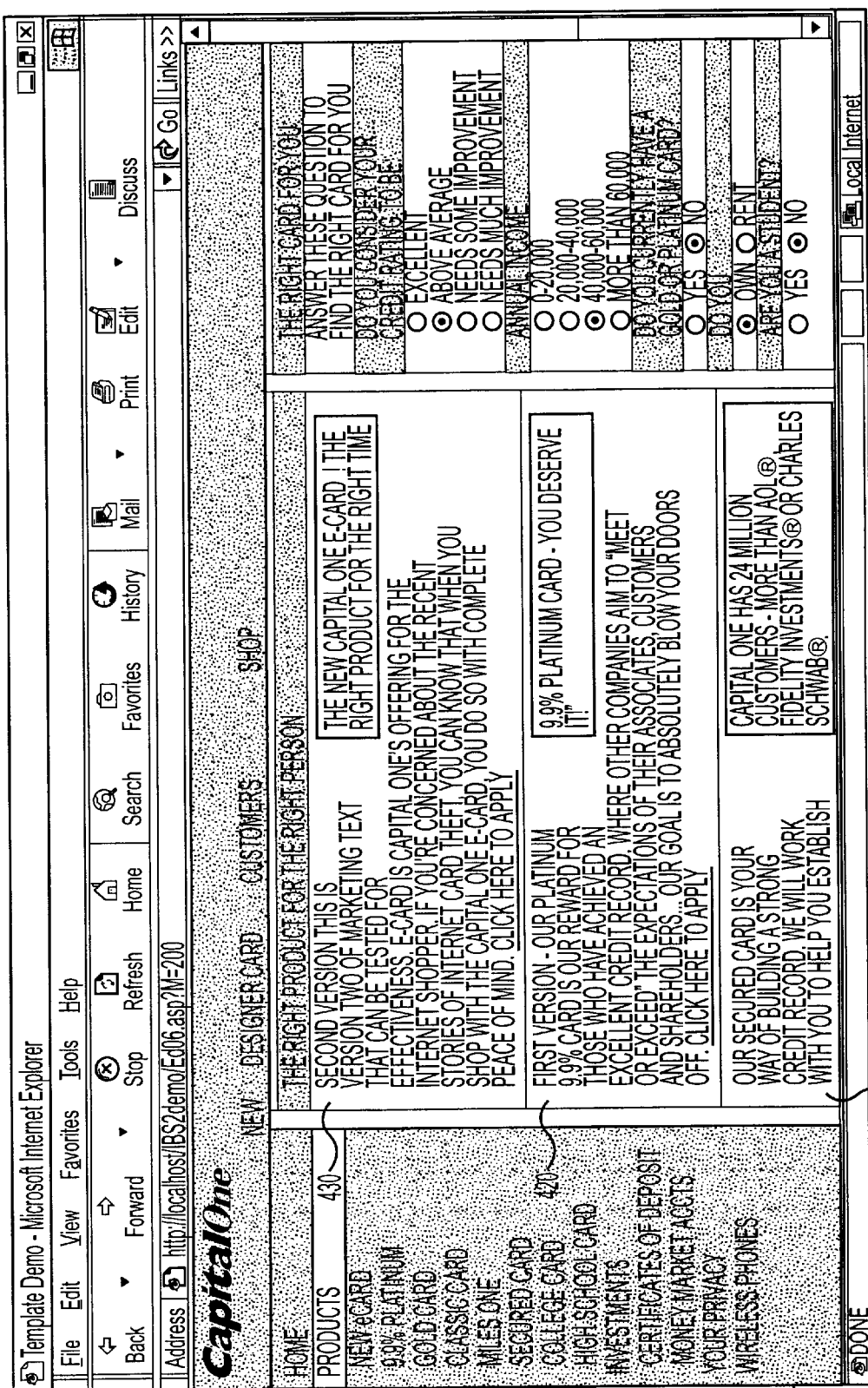
Figure 4C:
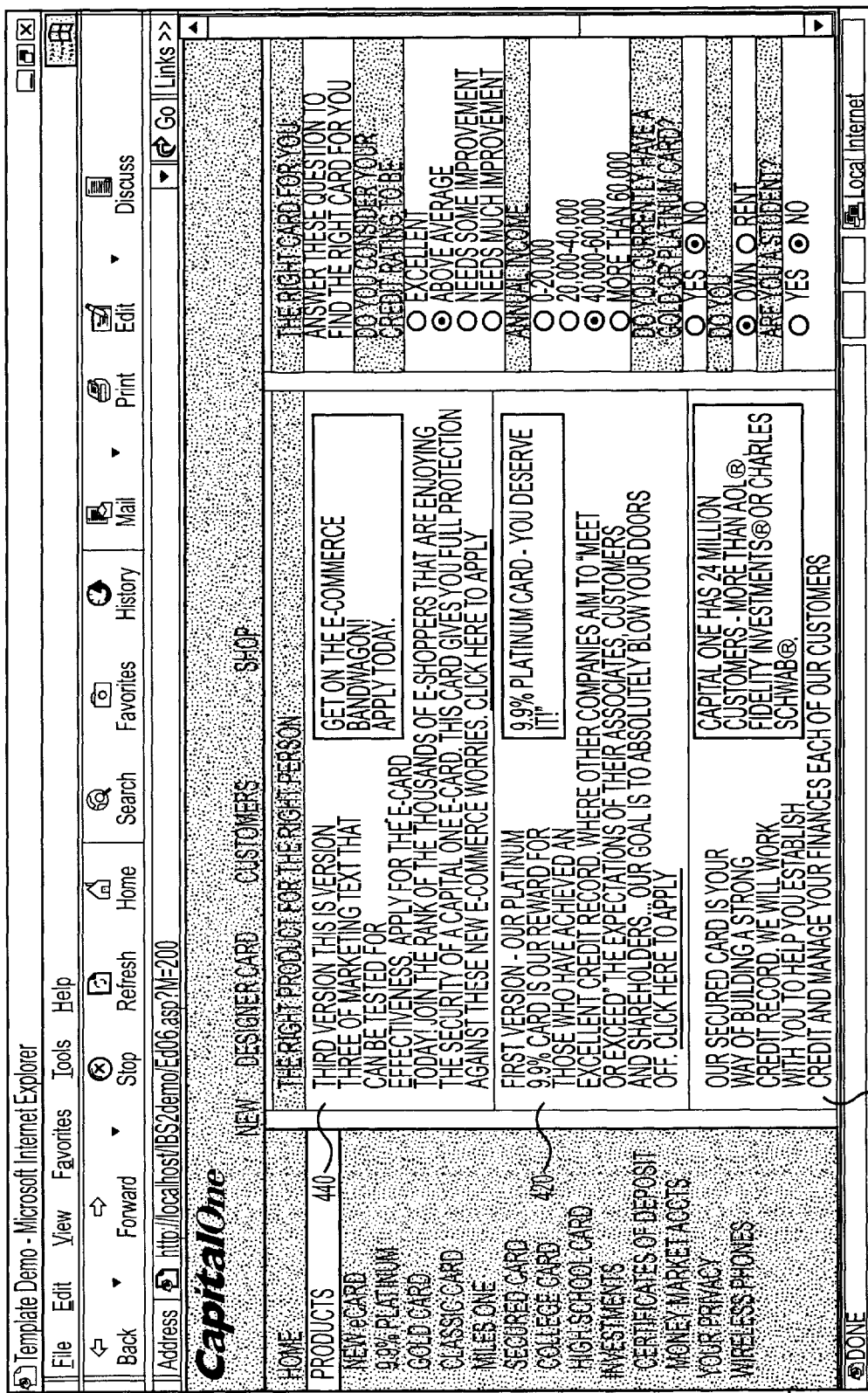

The content may also include various versions of the information associated with each credit card offered by the financial institution. FIGS. 4A-4C show Web page rendering examples of alternate versions of content representing credit card offers from a financial institution. FIG. 4A shows a Web page 400 displayed at a client node 150 via browser software. Web page 400 includes a first version 410 that shows first data that can describe customized information concerning one type of credit card available from the provider. First version 420 shows another credit card offered by the provider as well, while version 425 shows marketing information for another type of credit card. FIG. 4B illustrates a second version 430 positioned in the same location as first version 410. Second version 430 represents alternate content associated with the same credit card solicitation associated with first version 410. FIG. 4C illustrates a third version 440 positioned in the same location as first version 410. Third version 440 represents alternate content associated with the same credit card solicitation associated with first and second versions 410, 430.

Figure 4D:
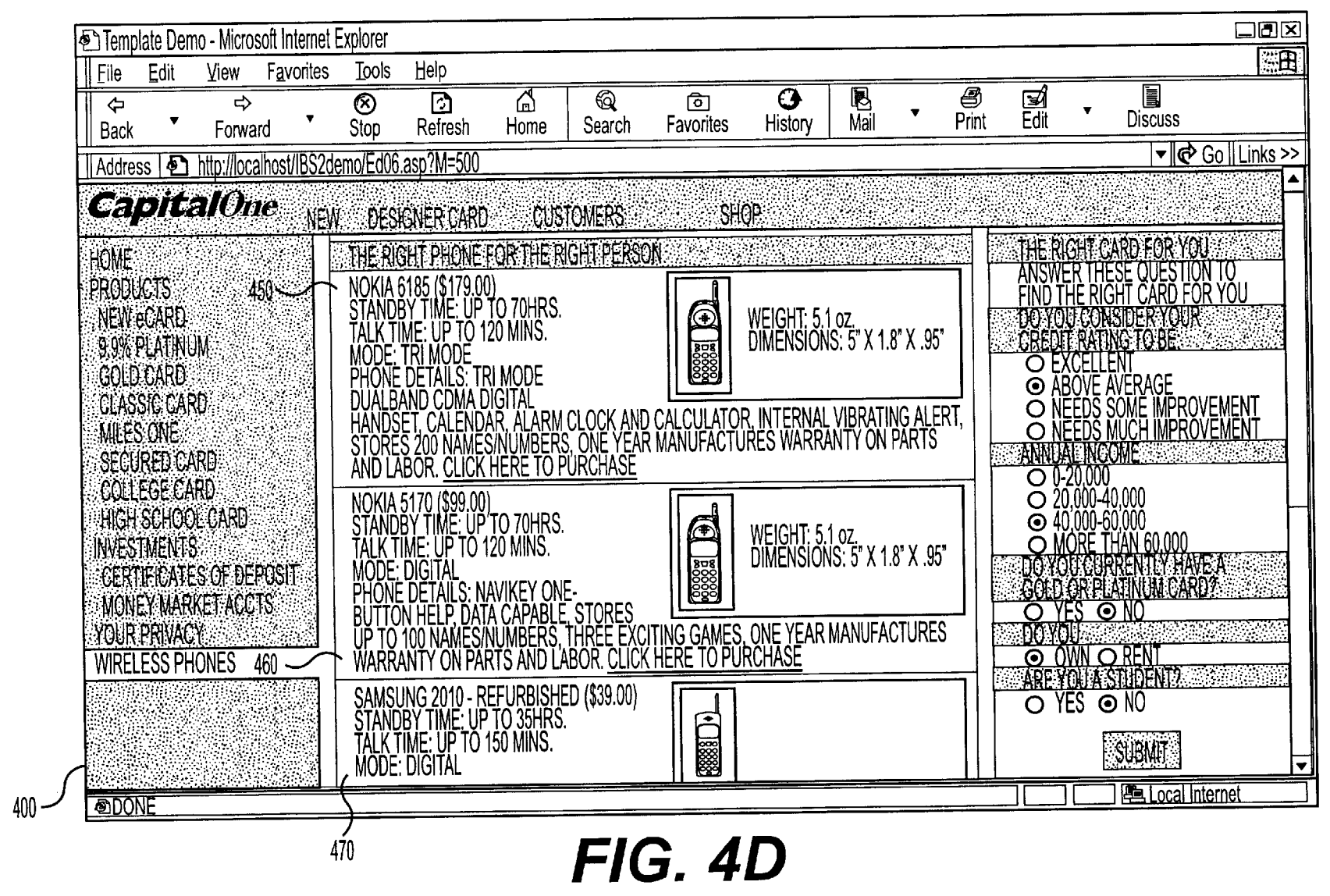
Figure 4E:
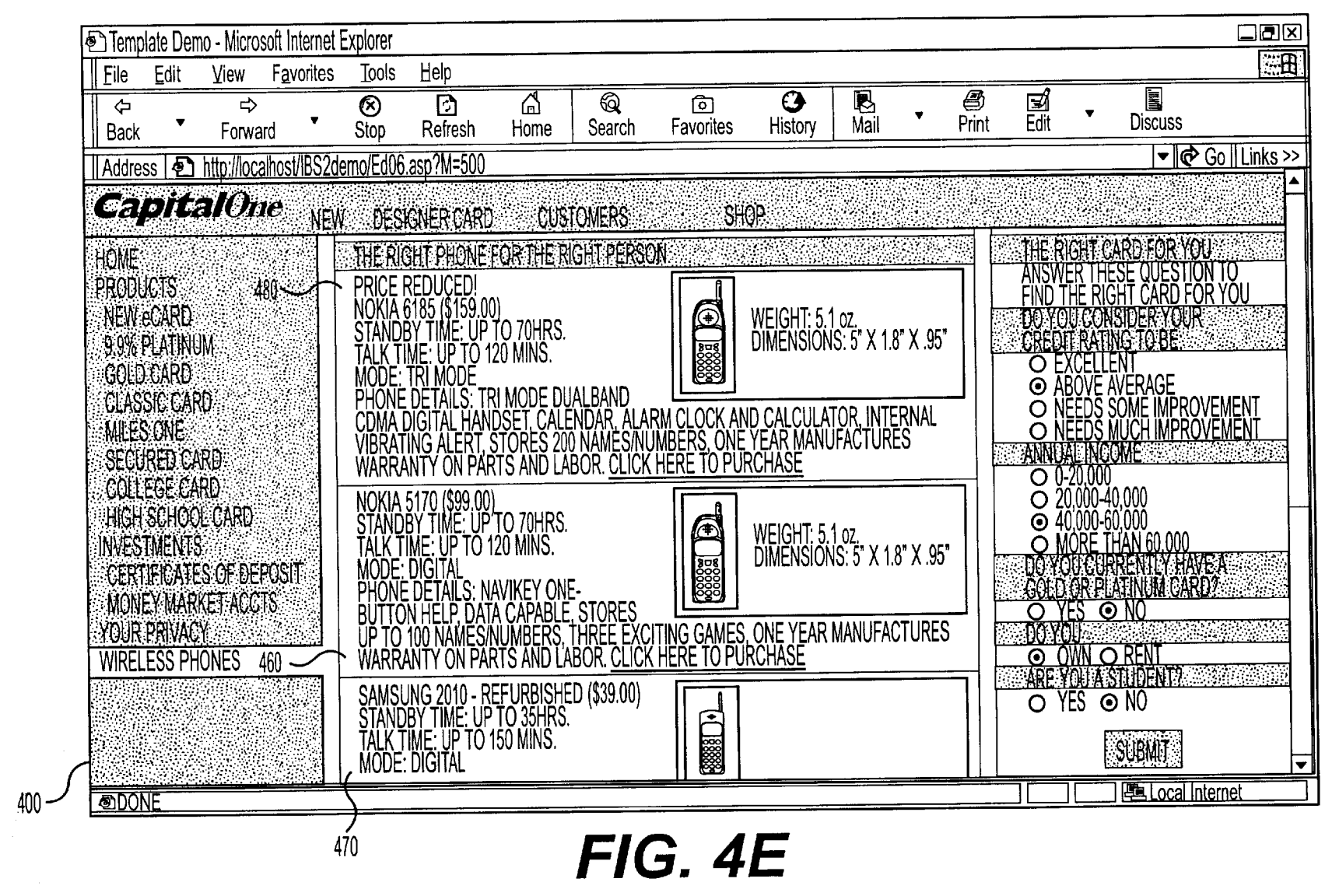
Figure 4F:
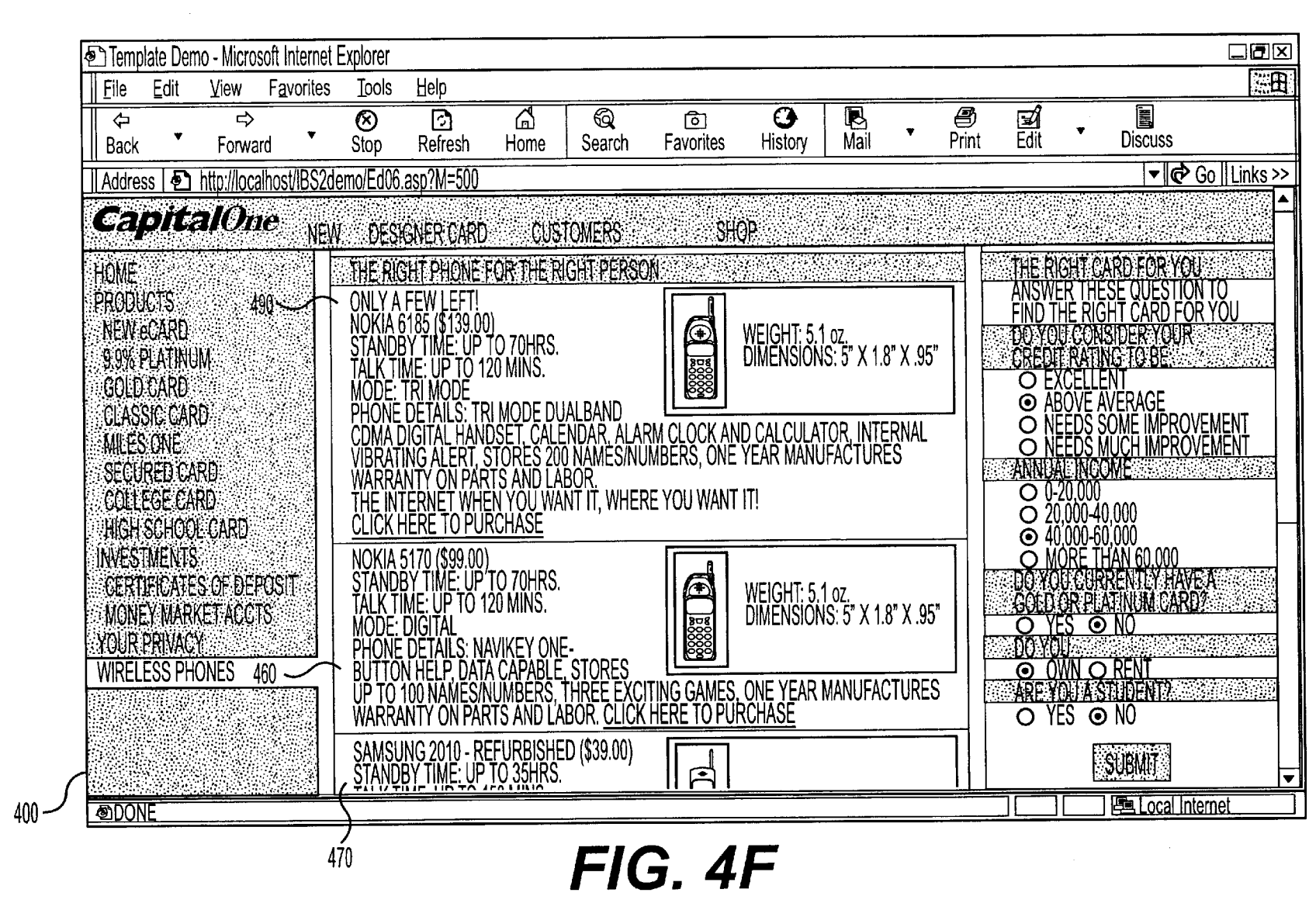

FIGS. 4D–4F show further examples of a Web page rendering examples of alternate versions of content representing actual products offered by a provider, in this case wireless phones. FIG. 4D illustrates Web page 400 displaying first versions, 450, 460 and 470, of wireless phones that can be purchased by the user from the provider. FIG. 4E shows version 480, which is an alternate rendering of version 450. FIG. 4F shows version 490, which is an alternate rendering of versions 450 and 480.

Thus, as can be seen from the examples of FIGS. 4A–4F, the content selected by a provider may represent a plurality of types of content, wherein the content itself ay represent alternate products or renderings of existing products or services offered by the provider.

Returning to FIG. 3, the defined rules associated with the content may include code that governs attribute information associated with existing content defined in Step S.310. These rules may govern, for example, frequency of the renderings of the content, color of the content, characteristics of multimedia files or links, and specific positioning or font of content rendered on Web page 400.

Figure 4G:
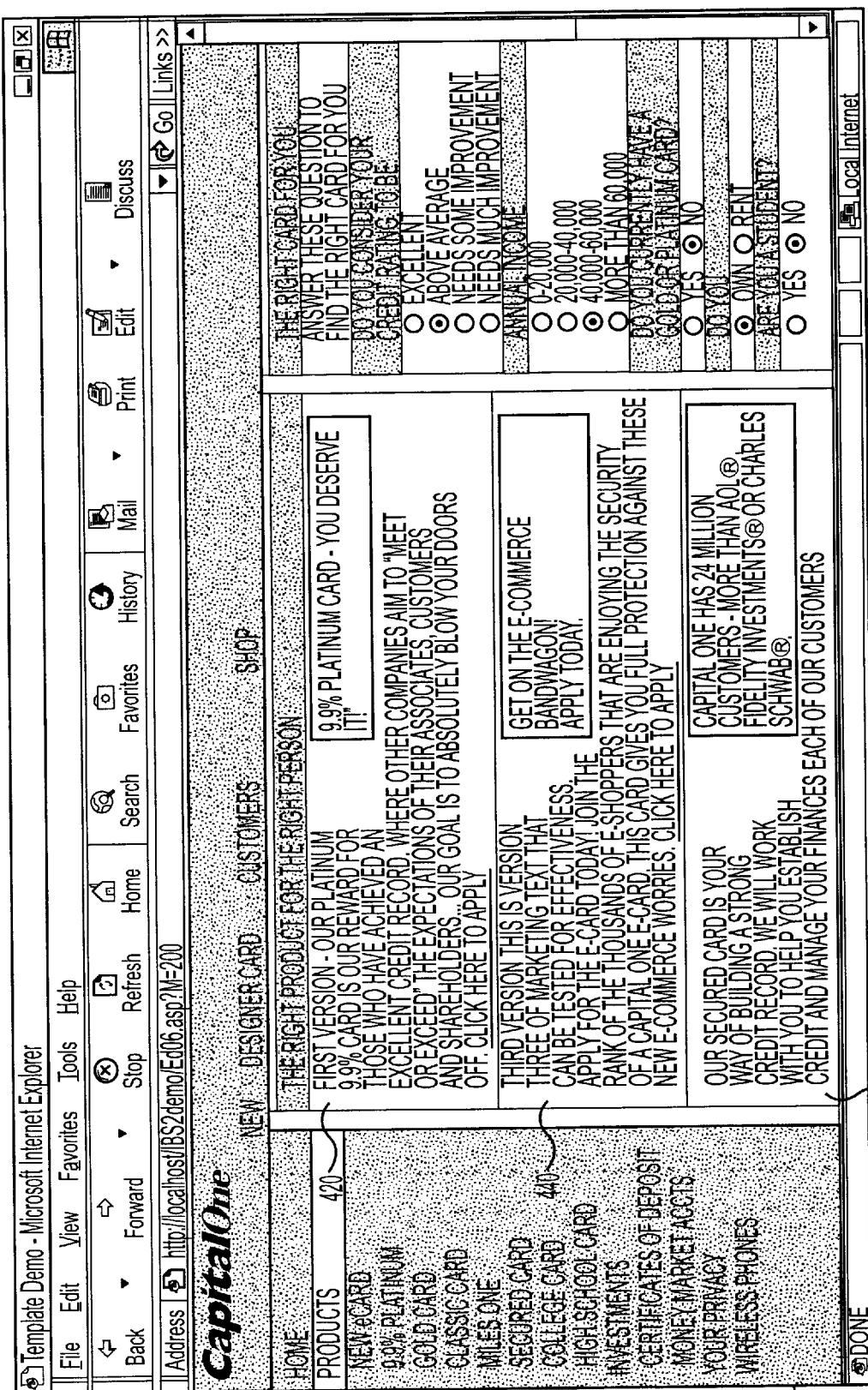

FIGS. 4G and 4H show the results of when the rules defined in data store 130 alter the position of the third version 440 described in FIG. 4C. Referring to FIG. 4C, third version 440 is shown at a first position "on top" of version 420. FIG. 4G illustrates Web page 400 adjusted by rules governing position of content, in this case third version 440 is positioned below version 420. FIG. 4H illustrates Web page 400 adjusted by rules governing position, in this case third version is positioned below version 425, and version 420 is positioned above version 425.

Figure 4I:
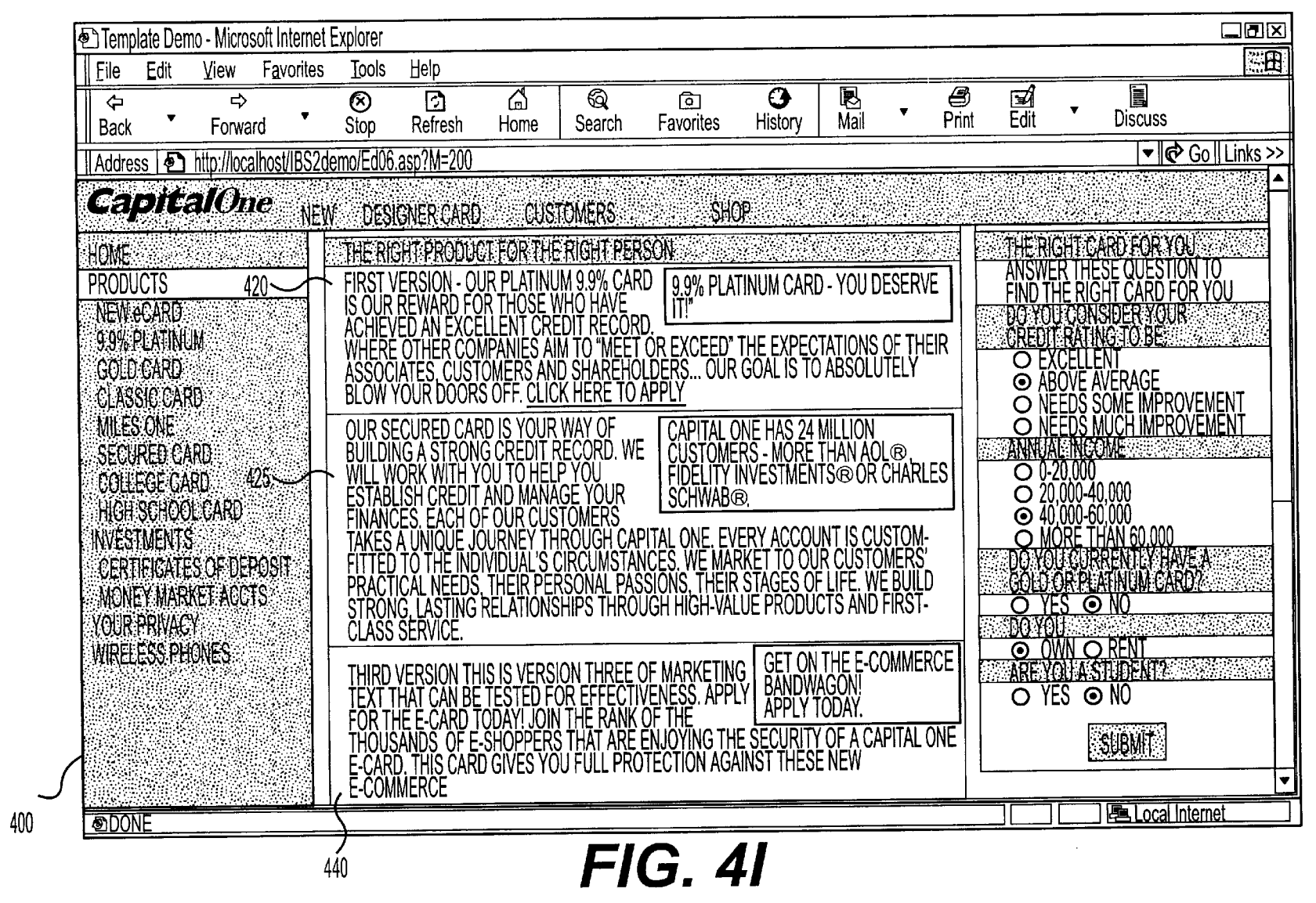
Figure 4J:
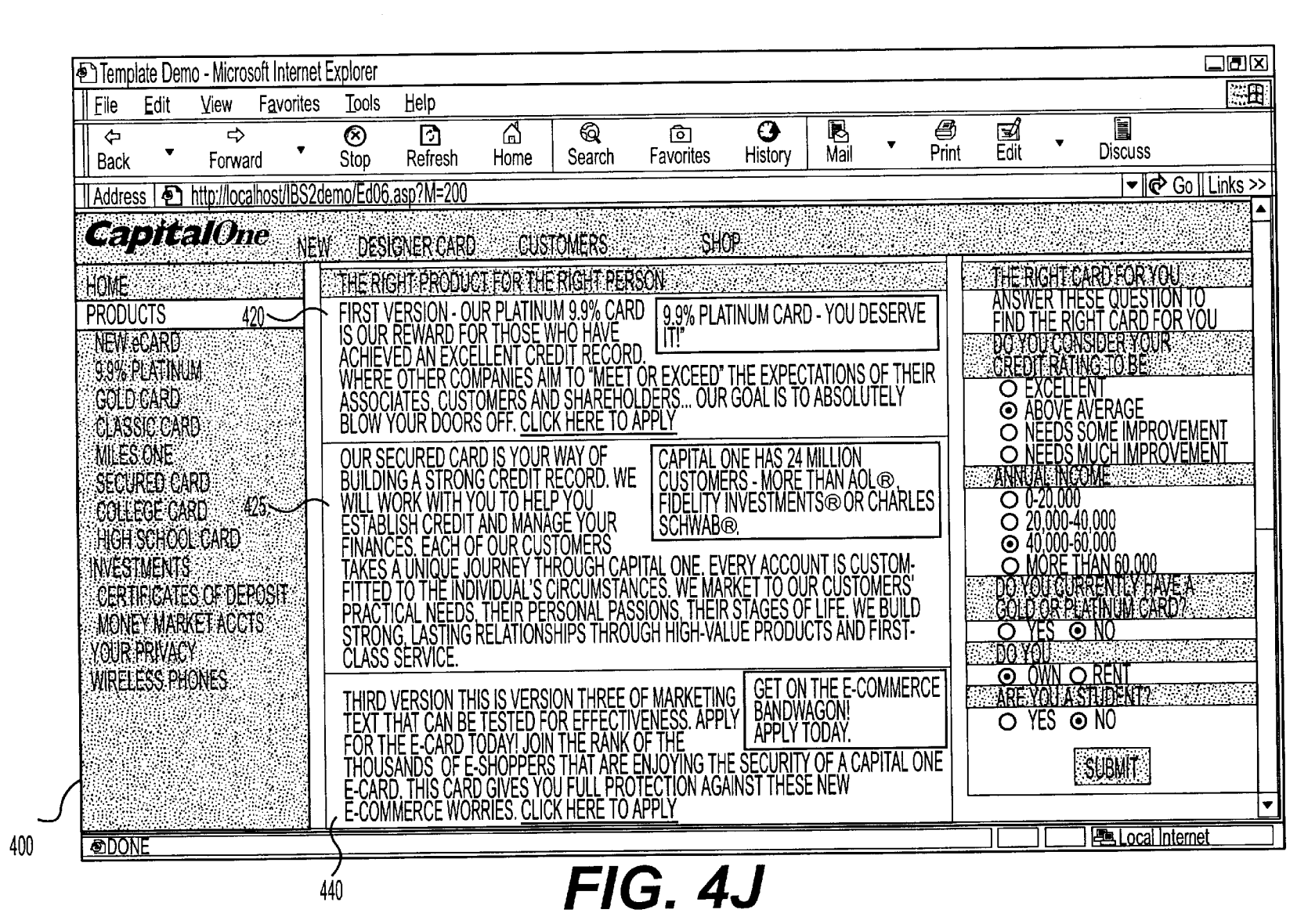

FIGS. 4I and 4J show the results of when the rules defined in Step 410, alter the font style of Web page 400 rendered in FIG. 4H. As can be seen, FIG. 4I illustrates versions 420, 425 and 440 displayed in a font style different from that shown in FIG. 4H, while FIG. 4J illustrates the same three versions displayed in a font style different from that shown in FIGS. 4H and 4I.

Accordingly, the content rules stored in data store 130 may be defined to alter the display of existing content by changing attributes, such as font and position. These rules may be defined to alter these attributes in combination or individually, depending on the results of analytical program 115, which process the effectiveness of a particular rendering presented to users located at the client nodes 150.

As previously described, the rules and content defined by methods, systems and articles of manufacture consistent with the present invention are not limited to the above described examples, rather only by the specific providers marketing or advertising their respective products and services. That is, the disclosed invention may be applied to a wide range of products and services which providers can solicit using a Web-based content delivery scheme.

Returning to FIG. 3, once data store 130 has been initialized with content and content rules, the analytical program is checked to determine whether it has been programmed and set by analysis system 170 (Step S.320). Upon determining that analytical program 115 has not been programmed, analysis system 170 downloads code representing analytical program rules associated with performing market analysis on user response data (Step S.330). In an alternate embodiment of the present invention, Step S.330 may be performed to determine whether analytical program 115 needs to be updated with new analytical program rules by analysis system 170.

Analysis system 170 may be an outside analysis entity, generally associated with a provider governing Web server 110. Analysis system 170 may perform detailed market and advertising analysis, and statistical analysis on the effectiveness and proposed effectiveness of content rendered in Web pages provided by Web server 110. Analysis system 170 may also generate analytical program rules that enable analytical program 115 to automatically make decisions on the effectiveness of presented content, based on the collected user response data. For example, one type of analytical program rule may analyze the percentage of time a number of versions of a Web page that has been rendered by Web server 110, in relation to a proportional "click-through" percentage for each particular version. Based on this analysis, the analytical program rule may adjust the rendering time for the version with the highest "click-through" rate. This example may be illustrated as follows:

Analytical Program Rule:

If version N's "click-through" rate increases by 10% for testing period X, proportionally adjust rendering time of version N by 25%.

TABLE 1

| | Content Version | | |
|---|---|---|---|
| | Version 1 | Version 2 | Version 3 |
| Rendering Time % | 33% | 33% | 33% |
| Click Through % | Down 10% | Up 15% | No change |

Analytical program 115 analyzes the above collected information, recognizes that Version 2 in Table 1 meets the criteria for the defined rule, and adjusts the rendering time of Version 2 as shown below in Table 2.

TABLE 2

| | Content Version | | |
|---|---|---|---|
| | Version 1 | Version 2 | Version 3 |
| Adjusted Rendering Time % | 21% | 58% | 21% |
| Click Through % | Not collected | Not collected | Not collected |

As described, Analysis system 170 may generate a wide range of analytical program rules based on a large number of conditions. That is, the analytical program rules downloaded to analytical program 115 are not limited to the above example, and may include rules that govern attributes other than rendering time such as content attributes (i.e. font, color, position, URL highlighting etc.).

Furthermore, analytical program rules may be include a combination of rules such that several content and Web page conditions are evaluated concurrently and multiple adjustments to the content may be executed. For example, in addition to the number of "click-throughs" being monitored and considered by the analytical program 115, the day of the week, or even the time of day, may also be considered. That is, user response data may indicate that a particular version is more popular on a weekend, or during selected hours of a day. Thus, a rule may include adjustments on rendering time based on not only "click-through" rate, but when the version is most popular. As described above, Version 2 may be rendered 58% of the time only on Saturdays, while version one is rendered 50% of the time on Mondays through Thursdays, from 6:00 P.M. to 10:00 P.M.

As can be seen, an endless number of combinations of user response data, and associated content adjustments may be incorporated into the analytical program rules executed by analytical program 115, and are not limited to the example described above.

Returning back to FIG. 3, once the rules and content have been defined and analytical program has been programmed, the content and rules are stored in data store 130 (Step S.340). In an alternate embodiment of the invention, step S.340 may be performed after the content and content rules are defined in step S.310.

When a request for a Web page is received by Web server 110, middleware program 112 executes an algorithm to determine what content needs to be built into the Web page before it is served to the client. In one embodiment of the invention, for an initial request for a Web page (i.e. a page that has never been rendered by Web server 110), middleware program 112 may first determine the type of user generating the request. This may be performed by retrieving user identification information associated with the user requesting the Web page, using techniques well known in the art, such as cookies, and checking the identification information against a user profile resource. This process allows the user, or a group of users, to be associated with particular social, economic, educational and commercial interests. The process of utilizing user or group profiles for classifying users for target marketing is well known in the art, and the present invention can implement any number of these techniques, as long as the required user information is retrieved and is available for processing.

Upon determining the type of user initially requesting the Web page, middleware program 112 accesses data store 130 to determine the associated content to be served to the user, via the Web page. Middleware program 112 uses the user's identification and profile information to select available content alternatives stored in data store 130. The rules associated with the content in data store 130 are implemented with the selected content, such that the rendering of the content is subject to the restrictions defined by its assigned content rules. Middleware program 112 applies the rules (Step S.350), and builds the content into the requested Web page and inventories the content for future analysis. The updated Web page is then served to the client node 150 where the user requesting the page is located. Client node 150 executes its browser application to present the updated Web page to the user (Step S.360).

In the event a request is received for a Web page that has already been served by Web server 110, middleware program 112 selects adjusted content and content rules based on results from the analytical program 115. The need for individual user profiling may be replaced with user group profiling. This process is associated with the analytical program 115 analyzing user response data and modifying the content and content rules stored in data store 130. As described above, middleware program 112 applies the content rules to the content and renders an adjusted Web page that is also used for subsequent market analysis.

Figure 5:
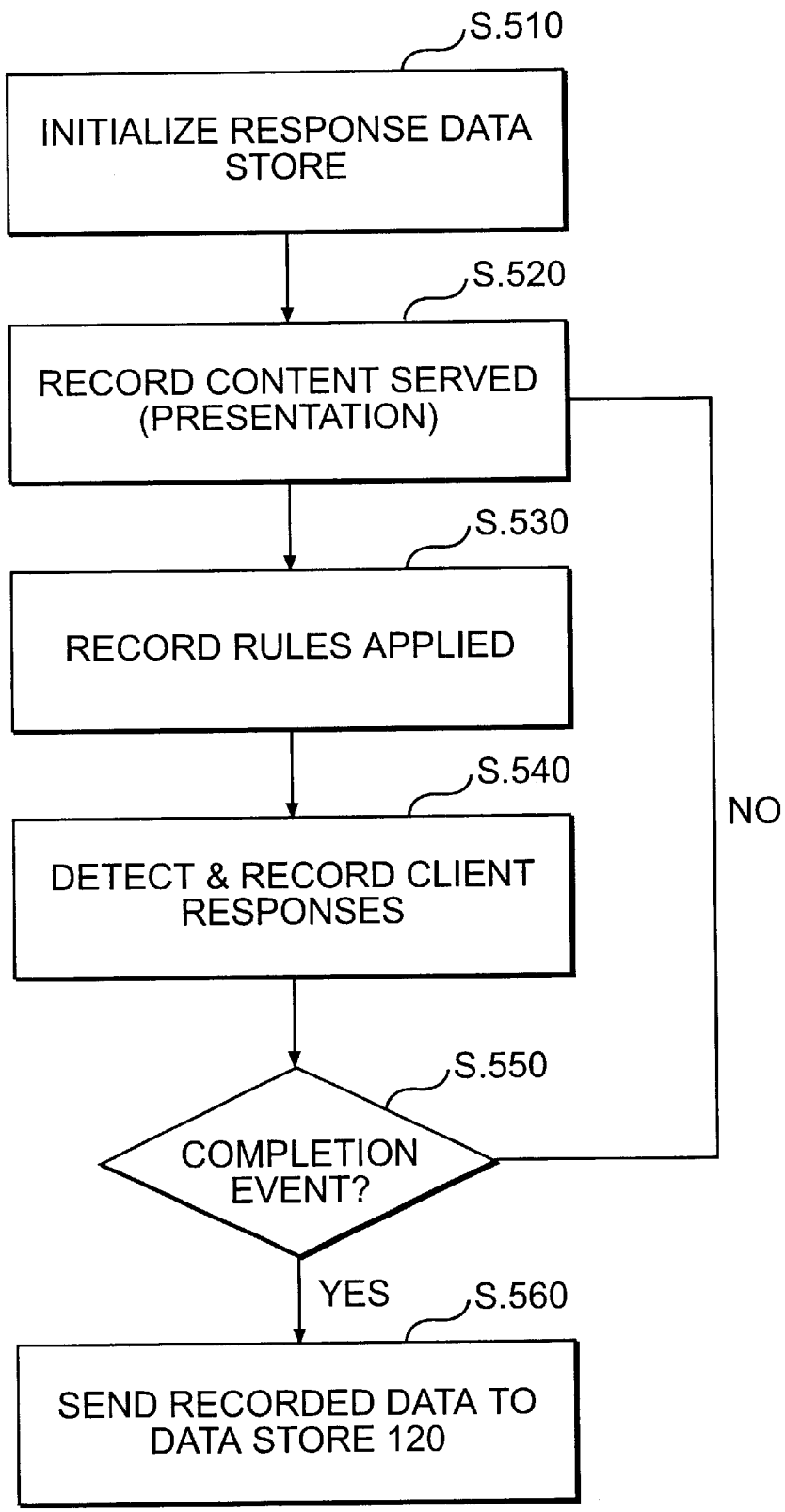
FIG. 5 is an exemplary flow chart of the steps performed by the data collection step shown in FIG. 2, in accordance with methods and systems consistent with the invention.

FIG. 5 is an exemplary flow chart of the data collection process described in FIG. 2. The process begins with the initialization of client side data store 160 (Step S.510). This step makes sure that each client side data store 160 is empty and can receive new information. The requested Web page provided to the client node 150 from the Web server 110, includes an algorithm implemented using client side scripting, applets or other similar processing techniques, for storing the content rendered (Step S.520) into the client side data store 160. The algorithm further is implemented to store the content rules applied to the content (Step S.530), as well as any other information pertinent to the identification of the type of data rendered at the client node 150.

Once the Web page is received and rendered at each client node 150, respective users "browse" the Web page, generating user activated events. These events may be associated with the user making link selections on the Web page to other pages, via URLs, mouse movements, screen scrolling, window resizing, or any other user initiated event. User behavior is monitored by capturing these events and storing them into client side data store 160 (Step S.540), using client side scripting, applets, or other similar processing techniques. For example, client side scripting languages such as JavaScript include commands that enable a program to recognize selected "events" performed by users. The client side script served to each client node by Web server 110, utilize these commands to collect detailed user response information, enabling the present invention to recognize not only well known user events, such as "click-throughs", but whether selected content is actually "in-view" to the users. As the user generates the events, the client side data store 160 accumulates the event data dynamically.

The "in-view" data collected by the client side scripts may provide information such as data indicating whether content is actually viewable by respective users, mouse movements across a Web page, position of the Web page based on screen scrolling, length of time a mouse pointer is positioned in a determined location of the Web page, and a plurality of other "detailed" user behavior events associated with browsing. The potential for an enormous amount of user response data to be collected may be controlled by the programming of the client side script implemented by Web server 110. In other words, Web server 110 may be programmed to provide client side scripts that monitor general user response data, or numerous detailed user response data, depending upon the level of granularity of market analysis desired by the Web server.

Once a client side trigger event occurs in a respective client node 150 (Step S.550), the information accumulated in client side data store 160 is ready for transmission to data store 120 and Web server 110 for processing. The client side trigger event may be associated with a plurality of customized events, including but not limited to, the client side data store 160 being filled up to a threshold limit, the browser being closed, or a user selecting another Web page. The provider of Web server 110 may determine the types of client side trigger events they wish to operate with, and have them programmed into the present invention's monitoring script. In one embodiment of the invention, Web server 110 may periodically send a signal to client nodes 150 initiating a trigger event.

The event data is sent back to Web server 110 by executing a routine associated with a URL appended to the Web page served at the client node 150. The Web page sent to the client node 150, includes a portion with a URL dedicated to the dynamic transmission of the collected data to Web server 110. The routine appends the collected user event data from the client data store 160, onto the dedicated URL. That portion of the Web page is dynamically reloaded, forcing the collected user event data to be sent to the Web server 110 (Step S.560). Upon receipt of the collected user event data, Web server 110 forwards it to data store 120 for storage. Thus, Web server 110 is continuously, periodically or regularly receiving user response data from each client node 150 being served by the Web server 110, giving the server updated marketing information from which to base analysis of the content rendered to the client nodes 150.

Figure 6:
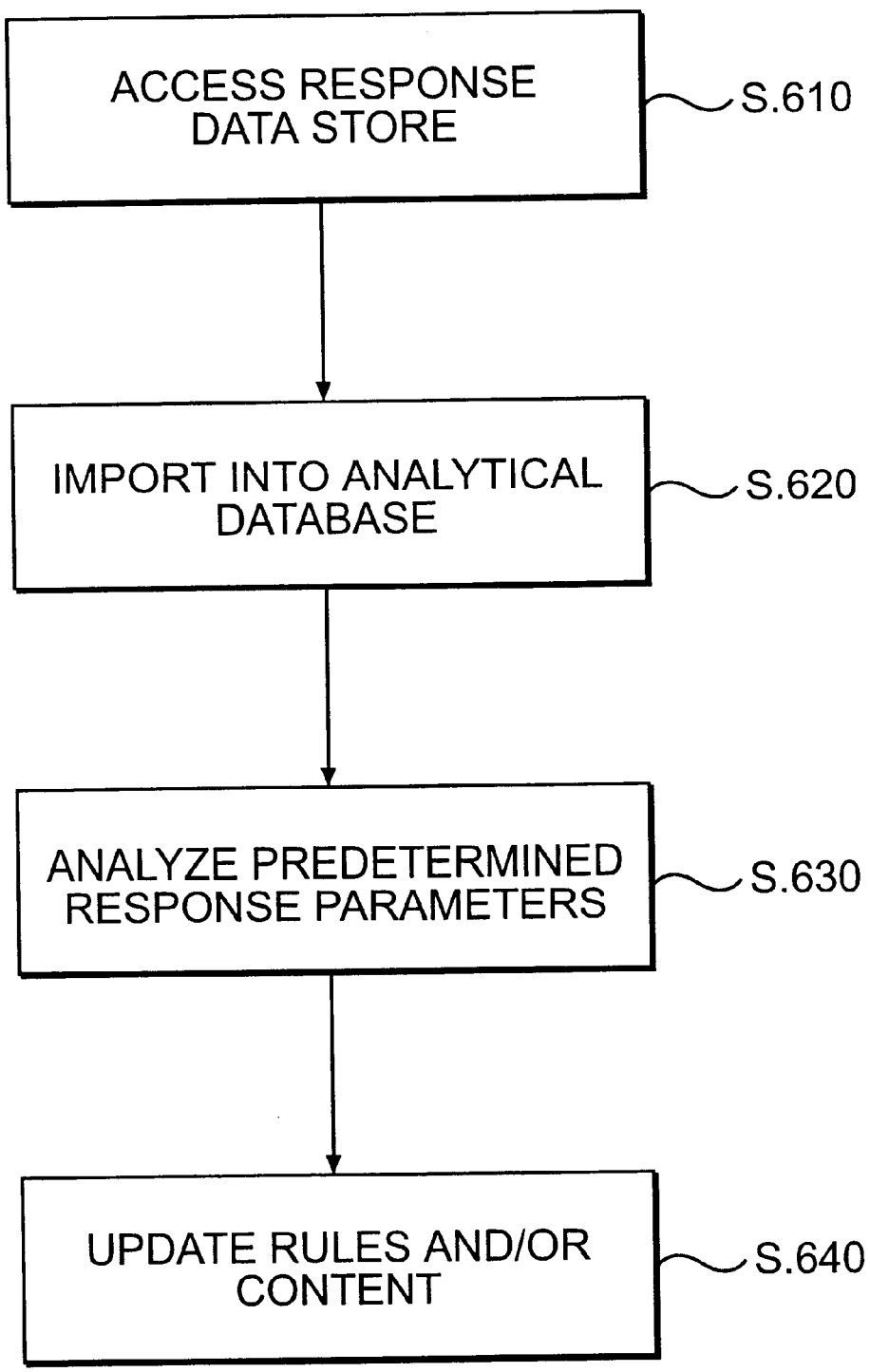
FIG. 6 is an exemplary flow chart of the steps performed by the analyze responses step shown in FIG. 2, in accordance with methods and systems consistent with the invention.

FIG. 6 is an exemplary flow chart of the analyze responses process described in FIG. 2. The process begins when the collected user responses stored in data store 120 are accessed by Web server 110 (Step S.610). Analytical program 115 retrieves the collected user response data and initiates an analysis program including the analytical program rules received by marketing and analysis system 170 (Step S.620). Analytical program 115 determines whether the Web page rendered at each client node 150, with its associated content, needs adjustment based on the collected user response data. Analysis may include correlating predetermined threshold values with the user response data. That is, if the user response data indicates that particular content was viewable to a user for a certain amount of time, based on the "in-view" features of the user response collection operations performed by the client side scripts, that may indicate the user was viewing the content for that certain time frame. Accordingly, a threshold value associated with particular content, and the amount of time it was viewable, may be incorporated into the analytical program rules programmed into analytical program 115. Analytical processing may include comparing the threshold value with the collected user response data to make a determination whether the content or rules stored in data store 130 need adjustment. The correlation processing performed by analytical program 115 may be associated with a plurality of user events, such as link selections, scrolling, maximizing/minimizing windows. Analytical program 115 processes the results of the analyzed user response data, and updates the content rules, and/or content stored in data store 130, automatically.

As previously mentioned, a multitude of combinations of analytical program rules may be applied concurrently with the analysis of a plurality of user response data stored in data store 120. For example, consider a Web page rendered by Web server 110 including an application that requires users to fill out selected fields requesting information, such as a credit card application. For this example, user response data collected by each client side script may include information regarding whether or not a respective user finished completing the application. In the case of incomplete applications, the client side scripts may collect information indicating where in the application a user stopped entering data, where the user's mouse was located for a majority of the rendering time, whether the user scrolled up and down the application prior to and during data entry, and how long the user stayed at the page during.

Further to the above-described example, the analytical program rules applied may be associated with each type of collected user response, such as a rule adjusting the color of a particular window within the application based upon the average position of the Web page "in view" to the users, or a rule adjusting the type of text or type of questions (fields) based upon the average rendering time of a particular portion of the application "in-view" to the users. The number of combinations of analytical program rules and associated user response data is countless and may be utilized by analytical program 115 and marketing and analysis system 170 when performing marketing analysis.

Upon completion of its analysis, analytical program 115 utilizes the collected response data and may apply a number of different rules associated with each response data characteristic, to determine what type of changes, if any, are needed to the content and content rules stored in data store 130 (Step S.630). Accordingly, the content rules and types of content may be altered or added to data store 130.

The analysis performed by analytical program 115 may be performed periodically based upon predetermined conditions set by Web server 110. These conditions may include, but are not limited to, a predetermined clock cycle time and the data store 120 reaching a maximum data threshold.

Upon Web Server 110 receiving a subsequent request for the Web page after analytical program 115 completes its analysis of the Web page, analytical program 115 determines whether automatic lift of the rendered content should occur, based upon the analyzed user response data, and information associated with the user located at client node 150 (Step S.640). Middleware program 112 applies the rules associated with the content based on the analytical program's analysis in order to produce modified content to be rendere din the Web page provided to client nodes 150.

Accordingly, Web server 110 may automatically adjust content rendered on the Web page previously rendered at client nodes 150. Providers controlling the Web server 110 may test the success of certain content or content rules on a customized and dynamic basis. That is, the provider of Web server 110 may program middleware program 112 to adjust the content to test new changes in attributes, or entirely new content, on an automatic basis using the content rules stored in data store 130 and the results of analytical program 115.

Once middleware program 112 determines the type of content and/or rules to apply to the content, the Web page is updated, and Web server 110 serves the updated page to the client nodes 150 requesting the page after analysis and modification of the page have been completed.

For example, consider users located at client nodes 150, viewing the Web page 400 shown in FIG. 4C. Systems, methods and articles of manufacture consistent with the present invention would enable the system to monitor the users' behavior associated with Web page 400, collecting detailed information about the users' activities. hi this case, assume a plurality of users viewing Web page 400 shown in FIG. 4C, "clicks-through" on one of the links displayed on the left hand side of Web page 400, under PRODUCTS within ten seconds of Web page being rendered on the users' client node 150. The activities of the users selecting the PRODUCTS link is stored in each respective client side data store 160. Once the users have selected a link on Web page 400, a client side trigger event was initiated (defined for this example), and the collected user information, along with the collected rules and content information, is sent to Web server 110, and subsequently stored in data store 120.

Assume for this example, that the amount of time third version 440 was displayed was a criteria for analysis defined in the analytical program rules executed by analytical program 115. In the above example, the plurality of users monitored did not satisfy predefined conditions for a successful rendering of the third version 440, because as defined in the analytical program rules, within ten seconds the users "clicked-through" to another link and ignored versions 440, 420 and 425 displayed in the center of Web page 300. Accordingly, results reflecting this analysis would be generated by analytical program 115, and in response to these analysis results analytical program 115 may redefine a content rule stored in data store 130. In this case, data store 130 includes a plurality of sufficient predefined rules and content, and no changes are made to content rules stored data store 130.

Middleware program 112 analyzes the content and content rules applied to Web page 400, and applies the rules to the content based on the results from the analytical program 115. In this case, analytical program 115 determined that a change in version position is the appropriate test to initiate, and middleware program 112 applies a content rule to the content in Web page 400 to adjust the position of versions 440, 420 and 425. The content rules are applied and the position of the content is altered, as shown in FIG. 4G, placing the third version 440 below version 420. Subsequently, when further requests for Web page 400 is received by Web server 400, the adjusted page shown in FIG. 4G is presented in place of the original page shown in FIG. 4C to the client nodes 150 requesting Web page 400.

The dynamic Web-based marketing operations are repeated, with user behavior being monitored at the adjusted Web page shown in FIG. 4G, and the system determines from these new responses whether further adjustments are needed or not. As can be seen, a provider of a Web server may track an enormous amount of marketing information from each user accessing selected Web sites, and gain useful marketing data on the interests and dislikes of potential consumers. This may enable these providers to dynamically adjust their content solicited to the users in order to target them more effectively and to automatically test the effectiveness of the Web pages provided by the Web server.

As a result, the present invention allows providers to perform automatic dynamic market testing. Methods, systems and articles of manufacture consistent with present invention enable users located at client nodes 150, to not only be targeted for advertising, but to also utilize the users' response for evaluating the success of particular rendered content. The dynamic market analysis performed by middleware program 112 enable Web server 110 to automatically adjust served content based on responses from users, in a "real-time" and "hands-free" closed loop operation, which is an advantage over conventional Web-based marketing techniques that require either drastic or time consuming analysis and manual adjustments to rendered content.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD–ROM; a carrier wave from the Internet or other propagation medium; or other forms of RAM or ROM. The scope of the invention is defined by the claims and their equivalents. ON,

What is claimed is:

1. A method for performing dynamic network content delivery in a network environment, the method comprising the steps of:

presenting a Web page including content to a plurality of users;

collecting, for each user, user initiated responses to the content;

analyzing the user initiated responses that are collected;

automatically updating the content based on the analysis of the user initiated responses; and providing the Web page including the updated content for viewing by a set of users.

2. The method of claim 1, wherein providing the Web page including the updated content includes receiving requests for the Web page from users and providing the Web-page in response to the received requests.

3. The method of claim 1, wherein providing the updated content includes rendering the Web page with different attributes.

4. The method of claim 1, wherein automatically updating the content further includes:

providing a first data store for storing the content;

providing rules associated with the content stored in the first data store; and applying the rules to the content stored in the first data store to produce the updated content provided to the user.

5. The method of claim 4, wherein the rules associated with the content stored in the first data store govern attributes associated with the content.

6. The method of claim 4, wherein the rules associated with the content stored in the first data store govern the type of content presented to the user.

7. The method of claim 5, wherein the attributes are the font of the content included in a Web page presented to the user.

8. The method of claim 5, wherein the attributes are the position of the content included in a Web page presented to the user.

9. The method of claim 5, wherein the attributes are any one of color, wording, size, background properties, border properties, text properties, graphics, tables, lists and the amount of time the content is presented to the user.

10. The method of claim 5, wherein the attributes are associated with multimedia scripts included in a Web page presented to the user.

11. The method of claim 1, wherein the content is products solicitated by a provider over the Internet.

12. The method of claim 1, wherein the content is services solicitated by a provider over the Internet.

13. The method of claim 1, wherein collecting further includes:

recording user initiated responses into a respective user side data store;

detecting a trigger event; and sending, in response to the detected trigger event, the recorded user initiated responses to a Web server.

14. The method of claim 13, wherein each trigger event is associated with each respective user side data store being filled with user initiated response data above a predetermined threshold level.

15. The method of claim 13, wherein each user is located at a respective client node and wherein each trigger event is associated with a respective user closing a browser application executing at the respective client node.

16. The method of claim 13, wherein each user is located at a respective client node and wherein each trigger event is associated with a respective user selecting a URL displayed on a Web page including the content presented to the respective user.

17. The method of claim 1, wherein the analyzing step further includes:

forwarding the collected user initiated user responses to an analytical program;

receiving results from the analytical program;

providing a first data store for storing a predefined group of content;

providing rules associated with each content stored in the first data store; and automatically editing the rules based on the results from the analytical program.

18. The method of claim 1, wherein presenting a Web page including content to includes receiving a requests for the Web page from the user.

19. The method of claim 1, wherein the user is located at a client node and the updating step is performed by a remote Web server that provides the content to the user through the client node.

20. The method of claim 19, wherein the updating step is automatically performed periodically by a program executed in the Web server.

21. A system for performing dynamic network market testing, comprising:

a Web server for providing Web pages over the Internet, wherein the Web pages each include respective content;

a first plurality of users, each user located at a respective client node, for requesting and viewing the content in at least one of the Web pages provided by the Web server, wherein each client node is connected to the Web server through the Internet and each client node includes a respective client side data store for storing user response data;

a first server side data store, connected to the Web server, for storing event data;

a second server side data store, connected to the Web server, for storing content data and rules associated with the content data;

a first client side program, executed at each client node, for collecting user response data associated with the content in the at least one Web page provided to each client node, storing the collected user response data in the respective client side data store and sending the collected user data to the first server side data store, via the Web server, as event data; and an analytical program, executed at the Web server, for retrieving the event data from the first server side data store, analyzing the event data, producing result data in response to the analysis of the event data, and updating the content and rules associated with the content data stored in the second server side data store; and a middleware program, executing in the Web server, for generating updated content to replace the content in the at least one Web page provided to the first plurality of users, based on the result data generated by the analytical program, wherein the updated content is provided to a second plurality of client nodes for subsequent viewing by a second plurality of users.

22. The system of claim 21, wherein providing the updated content to the second plurality of clients further includes receiving subsequent requests for the at least one Web page from the second plurality of users.

23. The system of 22, wherein the second plurality of users includes at least one of the first plurality of users.

24. The system of claim 21, wherein the middleware program automatically implements the content rules to generate the updated content, without any user intervention.

25. The system of claim 21, wherein each first client side program sends the collected user data to the first server side data store when a client side trigger event is detected at each respective client node.

26. The system of claim 25, wherein each client side trigger event is associated with a respective user closing a browser application executing at a respective client node.

27. The system of claim 25, wherein each client side trigger event is associated with a respective user, located at a respective client node, selecting a URL displayed on the at least one Web page provided by the Web server.

28. The system of claim 25, wherein each client side trigger event is associated with a predetermined time period being reached.

29. A method for dynamic network marketing, performed by a Web server, comprising the steps of:

receiving user response data associated with content data provided by the Web server to a first plurality of client browser applications;

sending the user response data to an analytical program for analysis;

receiving results of the analysis from the analytical program;

using the results and the user response data to automatically generate updated content data; and providing the updated content data to a second plurality of client browser applications.

30. The method of claim 29, wherein the content data is included in a Web page provided by the Web server and providing the updated content data to the second plurality of client browser applications further includes receiving subsequent requests for the Web page from the second plurality of client browser applications.

31. The method of 30, wherein the second plurality of client browser applications includes at least one of the first plurality of client browser applications.

32. The method of claim 29, wherein the updated content data is a modification of the content data provided to the first plurality of client browser applications.

33. The method of claim 29, wherein the content data provided to the first plurality client browsers includes text data, and the modification of the content data is associated with altering portions of the text data.

34. The method of claim 33, wherein content data provided to the first plurality of client browser applications includes text data, and the modification of the content data is associated with altering the font of the text data.

35. The method of claim 33, wherein content data provided to the first plurality of client browser applications includes text data, and the modification of the content data is associated with altering the position of the text data.

36. A method for automatic dynamic Web-based content delivery, performed by each of a plurality of client nodes, each client node is connected to a Web server through a network, the method comprising the steps of:

submitting a first request for a Web page to the Web server;

receiving the Web page from the Web server, wherein the Web page includes content data and a dedicated URL;

presenting the Web page to a user;

collecting user response data associated with user behavior to the presented Web page detecting a client side trigger event;

appending the collected user response data to the dedicated URL; and sending the collected user response data to the Web server in response to the client side trigger event, using the dedicated URL.

37. The method of claim 36, further comprising the steps of:

submitting a second request for the Web page from the Web server;

receiving from the Web server, an updated Web page including updated content data, wherein the updated Web page is a modification of the Web page received in response to the first request; and presenting the updated Web page including the updated content data to the user.

38. The method of claim 37, wherein the updated content data is a modification of the content data received from the Web server in response to the first request.

39. The method of claim 38, wherein content data received from the Web server in response to the first request includes text data, and the modification of the content data is associated with altering portions of the text data.

40. The method of claim 38, wherein the content data received from the Web server in response to the first request includes text data, and the modification of the content data is associated with altering the font of the text data.

41. The method of claim 38, wherein the content data received from the Web server in response to the first request includes text data and the modification of the content data is associated with altering the position of the text data.

42. The method of claim 36, wherein the dedicated URL includes an associated client side routine, and wherein the associated client side routine performs the steps of detecting, appending and sending.

43. The method of claim 36, wherein each client node includes a client side data store that records the collected user response data, and wherein each trigger event is associated with each respective client side data store being filled with user response data above a predetermined threshold level.

44. The method of claim 36, wherein each client node includes a client side data store that records the collected user response data and a client side browser application, and wherein each trigger event is associated with the user closing the client side browser application.

45. The method of claim 36, wherein each client node includes a client side data store that records the collected user response data and wherein each trigger event is associated with the user selecting a second LTRL displayed on the Web page received by the Web server in response to the first request.

46. A computer-readable medium, having a program means for performing dynamic network marketing when executed by a Web server, the Web server connected to a data store storing content and rules associated with the content, the program comprising:
- program code means for receiving a first request from each of a plurality of users for a Web page including content data;
- program code means for serving the Web page with the content data to the plurality of users, wherein the plurality of users are each located at a respective client node;
- program code means for receiving, from each client node, user response data associated with the content data included in the Web page served to the plurality of users;
- program code means for automatically selecting target rules from the rules stored in the data store, based on the received user response data;
- program code means for modifying one or more of the target rules based on the received user response data;
- program code means for automatically applying the target rules to the content presented to the plurality of users, wherein the target rules modify the presented content into updated content data; and
- program code means for automatically sending the updated content data to a second plurality of users, wherein each of the second plurality of users are located at a respective client node.

47. The computer-readable medium of claim 46, wherein the program means for automatically sending the updated content data to a second plurality of users further includes program code means for receiving subsequent requests for the Web page from the second plurality of users.

48. The computer-readable medium of claim 47, wherein the second plurality of users includes at least one of the users in the first plurality of users.

49. A system for performing dynamic network marketing over a network, the system comprising:
- means for presenting a Web page content to a user;
- means for collecting a response to the content initiated by the user;
- means for analyzing the collected user initiated response;
- means for automatically updating the content based on the analysis of the user initiated responses; and
- means for providing the Web page including the updated content to the user.

50. The system of claim 49, wherein the means for providing further includes means for receiving requests for the Web page from users and providing the Web page in response to the received requests.

51. The system of claim 49, wherein representing the updated content includes rendering the Web page with different attributes.

52. The system of claim 49, wherein the means for automatically updating the content further includes:
- means for providing a first data store for storing the content;
- means for providing rules associated with the content stored in the first data store; and
- means for applying the rules to the content stored in the first data store to produce the updated content presented to the user.

53. The system of claim 52, wherein the rules associated with the content stored in the first data store govern attributes associated with the content.

54. The system of claim 52, wherein the rules associated with the content stored in the first data store govern the type of content presented to the user.

55. The system of claim 53, wherein the attributes are the font of the content included in a Web page presented to the user.

56. The system of claim 53, wherein the attributes are the position of the content included in a Web page presented to the user.

57. The system of claim 53, wherein the attributes are any one of color, wording, size, background properties, border properties, text properties, graphics, tables, lists and the amount of time the content is presented to the user.

58. The system of claim 53, wherein the attributes are associated with multimedia files included in a Web page presented to the user.

59. The system of claim 49, wherein the content is products solicitated by a provider over the Internet.

60. The system of claim 49, wherein the content is services solicitated by a provider over the Internet.

61. The system of claim 49, wherein the means for collecting further includes:
- means for recording, for each user, user initiated responses into a respective user side data store;
- means for detecting, for each user, a trigger event; and
- means for sending, in response to each respective detected trigger event, the recorded user initiated responses to a Web server.

62. The system of claim 61, wherein each trigger event is associated with each respective user side data store being filled with user initiated response data above a predetermined threshold level.

63. The system of claim 61, wherein each user is located at a respective client node and wherein each trigger event is associated with a respective user closing a browser application executing at the respective client node.

64. The system of claim 61, wherein each user is located at a respective client node and wherein each trigger event is associated with a respective user selecting a URL displayed on the Web page including the content presented to the respective user.

65. The system of claim 49, wherein the means for analyzing further includes:
- means for forwarding the collected user initiated user responses to an analytical program;
- means for receiving results from the analytical program;
- means for providing a first data store for storing a predefined group of content;
- means for providing rules associated with each content stored in the first data store;
- means for automatically editing the rules based on the results from the analytical program.

66. The system of claim 49, wherein each user is located at a respective client node, and the means for automatically updating is performed by a Web server that provides the content to the first plurality of users through each respective client node.

67. The system of claim 66, wherein the means for updating is a program that is automatically and periodically executed in the Web server.

68. A computer-readable medium containing instructions for performing dynamic network marketing in a network when executed by a processor, the method comprising the steps of:
- presenting a Web page including content to a plurality of users;

collecting, for each user, user initiated responses to the content;

analyzing the user initiated responses that are collected;

automatically updating the content based on the analysis of the user initiated responses; and providing the Web page including the updated content to a set of users.

69. The computer-readable medium of claim 68, wherein providing further includes receiving requests for the Web page from users and providing the Web page in response to the received requests.

70. The computer-readable medium of 68, wherein providing includes rendering the Web page with different attributes.

71. The computer-readable medium of claim 68, wherein automatically updating the content further includes:

providing a first data store for storing the content;

providing rules associated with the content stored in the first data store; and applying the rules to the content stored in the first data store to produce the updated content provided to the user.

72. The computer-readable medium of claim 71, wherein the rules associated with the content stored in the first data store govern attributes associated with the content.

73. The computer-readable medium of claim 71, wherein the rules associated with the content stored in the first data store govern the type of content presented to the user.

74. The computer-readable medium of claim 72, wherein the attributes are the font of the content included in a Web page presented to the user.

75. The computer-readable medium of claim 72, wherein the attributes are the position of the content included in a Web page presented to the user.

76. The computer-readable medium of claim 72, wherein the attributes are any one of color, wording, size, background properties, border properties, text properties, graphics, tables, lists and the amount of time the content is presented to the user.

77. The computer-readable medium of claim 72, wherein the attributes are associated with multimedia files included in a Web page presented to the user.

78. The computer-readable medium of claim 68, wherein the content is products solicitated by a provider over the Internet.

79. The computer-readable medium of claim 68, wherein the content is services solicitated by a provider over the Internet.

80. The computer-readable medium of claim 68, wherein collecting further includes:

recording a user initiated response into a respective user side data store;

detecting a trigger event; and sending, in response to the detected trigger event, the recorded user initiated response to a Web server.

81. The computer-readable medium of claim 80, wherein each trigger event is associated with each respective user side data store being filled with user initiated response data above a predetermined threshold level.

82. The computer-readable medium of claim 80, wherein each user is located at a respective client node and wherein each trigger event is associated with a respective user closing a browser application executing at the respective client node.

83. The computer-readable medium of claim 80, wherein each trigger event is associated with a respective user, located at a respective client node, selecting a URL displayed on a Web page including the content presented to the respective user.

84. The computer-readable medium of claim 68, wherein the analyzing step further includes:

forwarding the collected user initiated user responses to an analytical program;

receiving results from the analytical program;

providing a first data store for storing a predefined group of content;

providing rules associated with each content stored in the first data store; and automatically editing the rules based on the results from the analytical program.

85. The computer-readable medium of claim 68, wherein the step of presenting content to a first plurality of users further includes receiving requests for the Web page from the plurality of users.

86. The computer-readable medium of claim 68, wherein each user is located at a respective client node, and the updating step is performed by a remote Web server that provides the content to each user through each respective client node.

87. The computer-readable medium of claim 86, wherein the updating step is automatically performed periodically by a program executed in the Web server.

88. A method for performing dynamic Web-based content delivery in a network environment, the method comprising the steps of:

presenting a Web page including content to a plurality of users;

collecting, for each user, user initiated responses to the content;

analyzing the user initiated responses that are collected;

automatically updating a rule associated with the content based on the analysis of the user initiated responses;

automatically updating the content based on the updated rule; and providing the Web page including the updated content for viewing by a set of users.

* * * * *

UNITED STATES PATENT AND TRADEMARK OFFICE
CERTIFICATE OF CORRECTION

PATENT NO. : 6,477,575 B1  Page 1 of 1
DATED : November 5, 2002
INVENTOR(S) : Arthur Koeppel and Jonathan Turner It is certified that error appears in the above-identified patent and that said Letters Patent is hereby corrected as shown below:

<u>Title page,</u>
Item [57], ABSTRACT,
Line 9, "its is" should read -- it is --.

<u>Column 15,</u>
Line 31, "Web-page" should read -- Web page --.

<u>Column 16,</u>
Line 32, after "content" delete "to".
Line 32, "requests" should read -- request --.

<u>Column 17,</u>
Line 15, "of 22" should read -- of claim 22 --.
Line 54, "of 30" should read -- of claim 30 --.
Line 61, after "plurality" insert -- of --.

<u>Column 18,</u>
Line 15, after "page" insert a semicolon.
Line 65, "LTRL" should read -- URL --.

<u>Column 19,</u>
Line 53, "of 49" should read -- of claim 49 --.

<u>Column 21,</u>
Line 13, "of 68" should read -- of claim 68 --.

Signed and Sealed this

Twenty-fifth Day of February, 2003

JAMES E. ROGAN
*Director of the United States Patent and Trademark Office*